(12) United States Patent
Tschiggfrie et al.

(10) Patent No.: US 11,084,513 B1
(45) Date of Patent: Aug. 10, 2021

(54) WAGON FRAME ASSEMBLY AND SYSTEM USING THE SAME

(71) Applicants: Lynnelle Renee Tschiggfrie, Grove City, OH (US); Richard James Tschiggfrie, Grove City, OH (US)

(72) Inventors: Lynnelle Renee Tschiggfrie, Grove City, OH (US); Richard James Tschiggfrie, Grove City, OH (US)

( * ) Notice: Subject to any disclaimer, the term of this patent is extended or adjusted under 35 U.S.C. 154(b) by 43 days.

(21) Appl. No.: 16/563,907

(22) Filed: Sep. 8, 2019

Related U.S. Application Data

(60) Provisional application No. 62/728,787, filed on Sep. 8, 2018.

(51) Int. Cl.
*B62B 5/00* (2006.01)
*B62B 3/00* (2006.01)
*B62B 3/10* (2006.01)
*B62B 3/02* (2006.01)

(52) U.S. Cl.
CPC .............. *B62B 3/007* (2013.01); *B62B 3/02* (2013.01); *B62B 3/10* (2013.01); *B62B 2202/52* (2013.01)

(58) Field of Classification Search
CPC .............. B62B 3/007; B62B 3/02; B62B 3/10
See application file for complete search history.

(56) References Cited

U.S. PATENT DOCUMENTS

| | | | |
|---|---|---|---|
| 2,020,766 A | 11/1935 | Brown | |
| 3,407,959 A | 10/1968 | Mondineu | |
| 3,762,593 A | 10/1973 | Beretta | |
| 4,953,878 A | 9/1990 | Sbragia | |
| 5,641,197 A | 6/1997 | Springmann | |
| 5,915,722 A | 6/1999 | Thrasher et al. | |
| 5,915,723 A | 6/1999 | Austin | |
| 5,957,352 A | 9/1999 | Gares | |
| 6,328,329 B1 | 12/2001 | Smith | |
| 6,343,390 B1 | 2/2002 | Yang et al. | |
| 7,398,978 B2 | 7/2008 | Cheung | |
| 7,625,033 B2 | 12/2009 | Michelau et al. | |
| 7,645,109 B2 | 1/2010 | Stukenholtz et al. | |
| 7,731,221 B2 | 6/2010 | Bess | |
| 7,922,140 B2 | 4/2011 | Carver | |
| 7,963,530 B1 * | 6/2011 | Garcia | B62B 3/02 280/30 |
| 8,011,686 B2 | 9/2011 | Chen et al. | |
| 8,024,825 B2 | 9/2011 | Harrison et al. | |
| 8,047,391 B2 | 11/2011 | Lu | |

(Continued)

*Primary Examiner* — Brian L Swenson
(74) *Attorney, Agent, or Firm* — The Law Office of Patrick F. O'Reilly III, LLC

(57) ABSTRACT

A wagon frame assembly and a system using the same are disclosed herein. In one or more embodiments, an adjustable wagon frame assembly includes a frame structure having a plurality of frame members, the frame structure configured to fit at least partially inside a wagon bed of a pull-type wagon, the frame structure configured to support one or more objects proximate to a periphery of the wagon bed so as to leave a central region of the wagon bed open for transporting one or more additional objects, one or more people, and/or one or more animals. In these one or more embodiments, at least one of the plurality of frame members is adjustable relative to at least another of the plurality of frame members so as to enable the frame structure to fit a plurality of wagon beds having different sizes.

15 Claims, 14 Drawing Sheets

(56) References Cited

U.S. PATENT DOCUMENTS

| | | | |
|---|---|---|---|
| 8,998,011 B2 | 4/2015 | Zhu | |
| 9,101,206 B1 | 8/2015 | Chen et al. | |
| 9,145,154 B1 | 9/2015 | Horowitz | |
| 9,623,890 B1* | 4/2017 | Horowitz | B62B 3/005 |
| 10,370,018 B1* | 8/2019 | Maher | B62B 13/18 |
| 10,525,894 B1* | 1/2020 | Williamson | B60R 9/04 |
| 2006/0119056 A1* | 6/2006 | Olsen | A47B 3/10 |
| | | | 280/30 |
| 2010/0059950 A1* | 3/2010 | Coghill, Jr. | B62B 1/14 |
| | | | 280/47.26 |
| 2011/0025005 A1* | 2/2011 | Howell | B62B 3/022 |
| | | | 280/47.24 |
| 2018/0170418 A1* | 6/2018 | Choi | B62B 7/08 |
| 2018/0237046 A1* | 8/2018 | Bovino | B60L 50/60 |
| 2018/0297622 A1* | 10/2018 | Chen | B62B 3/007 |

\* cited by examiner

See Detail "A"

Detail "A"

Section View A-A

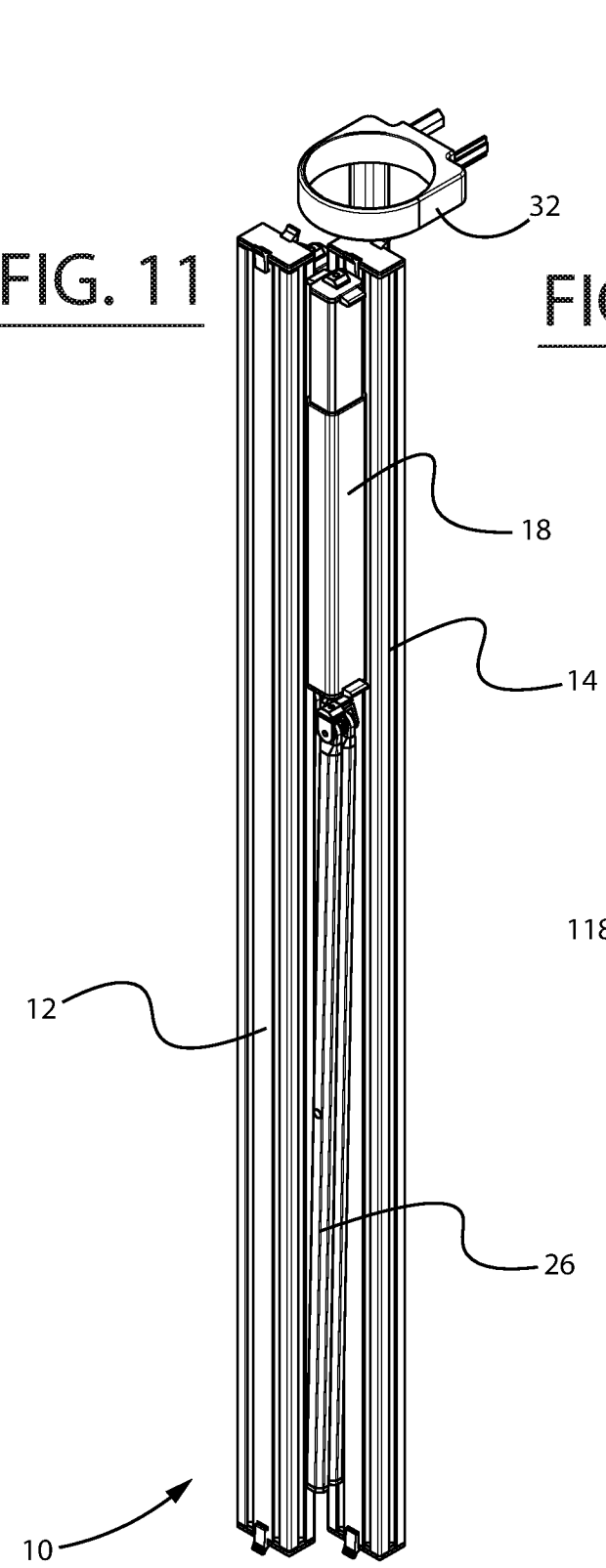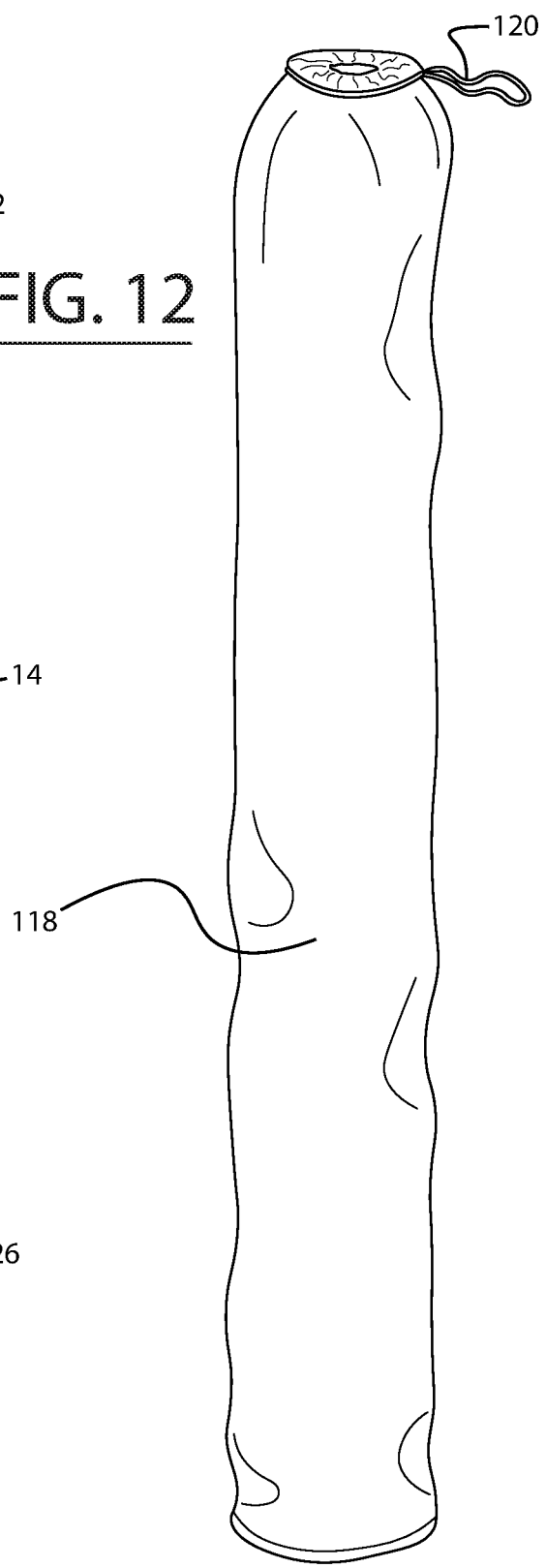

Detail "B"

Detail "C"

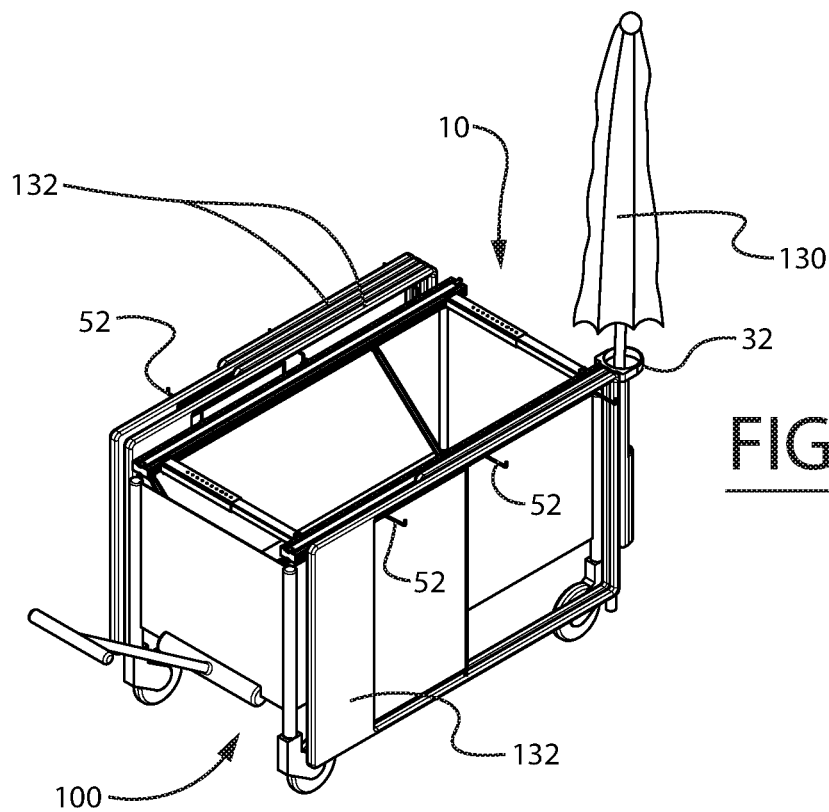
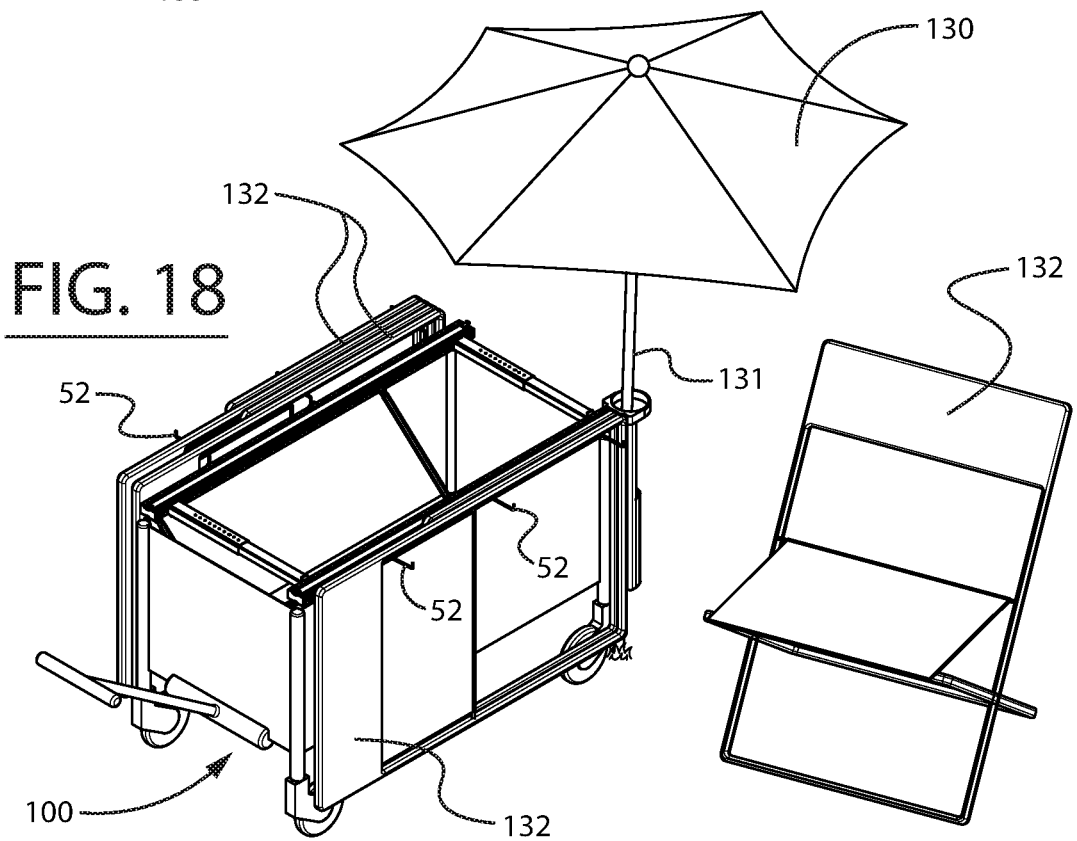

WAGON FRAME ASSEMBLY AND SYSTEM USING THE SAME

CROSS-REFERENCE TO RELATED APPLICATIONS

This patent application claims priority to, and incorporates by reference in its entirety, U.S. Provisional Patent Application No. 62/728,787, entitled "Wagon Frame Assembly And System Using The Same", filed on Sep. 8, 2018.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a wagon frame assembly and a system using the same. More particularly, the invention relates to a wagon frame assembly that is configured to be inserted into the bed of a wagon so as to enable objects to be supported about the periphery of the wagon bed, while allowing additional objects, people, and/or animals to be accommodated in the central region of the wagon bed.

2. Background

Utility or beach wagons are known that are used for transporting items from one location to another, without the need for a user to carry the items by hand. While these wagons are very useful for this purpose, wagons of this type have numerous limitations and drawbacks. For example, when a utility wagon is being used to transport items being used by spectators on the sidelines of a sporting event, it is often necessary for the spectators to load and unload the wagon each time they move from one location to another location (e.g., as the spectators are switching fields or moving to different locations on the same field). The constant loading and unloading of the utility wagon is both laborious and time consuming, thus preventing the users from realizing a maximal amount of benefit from such a wagon. In addition, conventional utility wagons are not designed to support items therefrom while the wagon is parked at a particular location, thus requiring the users thereof to manually support these items, or use a separate structure to support these items, thus adding to the laborious nature of using wagons in such an application.

Therefore, what is needed is a wagon frame assembly that is able to support one or more objects proximate to a periphery of a wagon bed so as to leave a central region of the wagon bed open for additional objects. Moreover, a wagon frame assembly is needed that obviates the need for loading and unloading the entire contents of a wagon each time the wagon is moved from one location to another location at a particular event. Furthermore, there is a need for a wagon frame assembly that is adjustable so as to enable the wagon frame assembly to fit a plurality of wagon beds having different sizes.

BRIEF SUMMARY OF EMBODIMENTS OF THE INVENTION

Accordingly, the present invention is directed to a wagon frame assembly and a system using the same that substantially obviates one or more problems resulting from the limitations and deficiencies of the related art.

In accordance with one or more embodiments of the present invention, there is provided an adjustable wagon frame assembly that includes a frame structure having a plurality of frame members, the frame structure configured to fit at least partially inside a wagon bed of a pull-type wagon, the frame structure configured to support one or more objects proximate to a periphery of the wagon bed so as to leave a central region of the wagon bed open for transporting one or more additional objects, one or more people, and/or one or more animals. In these one or more embodiments, at least one of the plurality of frame members is adjustable relative to at least another of the plurality of frame members so as to enable the frame structure to fit a plurality of wagon beds having different sizes.

In a further embodiment of the present invention, the frame structure comprises a plurality of longitudinal frame members and one or more transverse frame members attached between a pair of the longitudinal frame members, the one or more transverse frame members having an adjustable length so as to enable a width of the frame structure to be adjusted to accommodate the wagon beds having different sizes.

In yet a further embodiment, the frame structure further comprises a plurality of leg members, the plurality of leg members configured to elevate at least one of the longitudinal frame members and/or at least one of the transverse frame members above a top surface of the wagon bed such that a portion of the frame structure protrudes above one or more sides of the wagon bed.

In still a further embodiment, at least one of the plurality of leg members is adjustably attached to at least one of the longitudinal frame members or at least one of the transverse frame members so as to accommodate the wagon beds having different sizes.

In yet a further embodiment, the frame structure is at least partially collapsible so as to make the frame structure more compact for the storage and transportation thereof.

In still a further embodiment, the frame structure is capable of being disassembled so as to make the frame structure more compact for the storage and transportation thereof.

In yet a further embodiment, the adjustable wagon frame assembly further comprises one or more hook members coupled to the frame structure, each of the one or more hook members configured to support a hanging object on a side of the wagon bed.

In still a further embodiment, the one or more hook members are adjustably connected to the frame structure so as to enable a position of the one or more hook members to be adjusted.

In yet a further embodiment, the one or more hook members are pivotably coupled to the frame structure so as to enable the one or more hook members to be rotated between an operative position and a stowed position.

In still a further embodiment, the adjustable wagon frame assembly further comprises an umbrella support coupled to the frame structure, the umbrella support configured to support an umbrella in an upright position on the frame structure.

In yet a further embodiment, the umbrella support comprises a lower holster portion and an upper annular portion, the umbrella configured to be positioned in the lower holster portion and the upper annular portion of the umbrella support, and the umbrella support configured to be removable from the frame structure.

In still a further embodiment, the frame structure further comprises one or more removable end caps detachably connected to one or more of the plurality of frame members, the one or more removable end caps enabling a variety of different accessories to be selectively attached to, and detached from, the one or more of the plurality of frame members.

In accordance with one or more other embodiments of the present invention, there is provided a wagon frame assembly that includes a frame structure having a plurality of frame members, the frame structure configured to fit at least partially inside a wagon bed of a pull-type wagon, the frame structure configured to support one or more objects proximate to a periphery of the wagon bed so as to leave a central region of the wagon bed open for transporting one or more additional objects, one or more people, and/or one or more animals; and one or more hook members and/or an umbrella support coupled to the frame structure, each of the one or more hook members configured to support a hanging object on a side of the wagon bed, the umbrella support configured to support an umbrella in an upright position on the frame structure.

In a further embodiment of the present invention, the frame structure comprises a plurality of longitudinal frame members and one or more transverse frame members attached between a pair of the longitudinal frame members, the one or more transverse frame members having an adjustable length so as to enable a width of the frame structure to be adjusted to accommodate wagon beds having different sizes.

In yet a further embodiment, the frame structure further comprises a plurality of leg members, the plurality of leg members configured to elevate at least one of the longitudinal frame members and/or at least one of the transverse frame members above a top surface of the wagon bed such that a portion of the frame structure protrudes above one or more sides of the wagon bed.

In still a further embodiment, at least one of the plurality of leg members is adjustably attached to at least one of the longitudinal frame members or at least one of the transverse frame members so as to accommodate the wagon beds having different sizes.

In yet a further embodiment, the frame structure is at least partially collapsible so as to make the frame structure more compact for the storage and transportation thereof.

In still a further embodiment, the frame structure is capable of being disassembled so as to make the frame structure more compact for the storage and transportation thereof.

In yet a further embodiment, the one or more hook members are adjustably connected to the frame structure so as to enable a position of the one or more hook members to be adjusted.

In still a further embodiment, the one or more hook members are pivotably coupled to the frame structure so as to enable the one or more hook members to be rotated between an operative position and a stowed position.

In yet a further embodiment, the umbrella support comprises a lower holster portion and an upper annular portion, the umbrella configured to be positioned in the lower holster portion and the upper annular portion of the umbrella support, and the umbrella support configured to be removable from the frame structure.

In still a further embodiment, the frame structure further comprises one or more removable end caps detachably connected to one or more of the plurality of frame members, the one or more removable end caps enabling a variety of different accessories to be selectively attached to, and detached from, the one or more of the plurality of frame members.

In accordance with yet one or more other embodiments of the present invention, there is provided a wagon frame system that includes a pull-type wagon having a wagon bed and a graspable handle, the wagon bed comprising a bed floor and a plurality of sides extending upwardly from the bed floor; and a frame structure having a plurality of frame members, the frame structure configured to be inserted into the wagon bed of the pull-type wagon, the frame structure configured to support one or more objects proximate to a periphery of the wagon bed so as to leave a central region of the wagon bed open for transporting one or more additional objects, one or more people, and/or one or more animals.

In a further embodiment of the present invention, the frame structure comprises a plurality of leg members, the plurality of leg members configured to rest on the bed floor of the wagon bed so that a portion of the frame structure protrudes above the plurality of sides of the wagon bed.

In yet a further embodiment, the wagon frame system further comprises one or more hook members coupled to the frame structure, each of the one or more hook members configured to support a hanging object on a respective one of the plurality of sides of the wagon bed, at least one of the one or more hook members extending outwardly from the frame structure above a top edge of one of the plurality of sides of the wagon bed.

In still a further embodiment, the wagon frame system further comprises an umbrella support coupled to the frame structure, the umbrella support configured to support an umbrella in an upright position on the frame structure.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 11 is another perspective view of the disassembled components of the adjustable wagon frame assembly of FIG. 1, wherein the components have been clustered together for compact storage;

FIG. 12 is a perspective view of a storage bag housing the disassembled components of the adjustable wagon frame assembly of FIG. 1;

FIG. 17 is yet another perspective view of the adjustable wagon frame assembly of FIG. 1, wherein the adjustable wagon frame assembly is shown installed in the wagon bed of the pull-type wagon to support folding chairs and an umbrella about the periphery of the wagon, while leaving the central portion of the wagon bed open for additional cargo;

FIG. 18 is a perspective view similar to that of FIG. 17, except that the umbrella supported on the wagon is disposed in its open state, and one of the folding chairs has been set up next to the wagon;

FIG. 23b is a partial perspective view similar to that of FIG. 23a, except that the umbrella is shown disposed on the top of the wagon for transportation, rather than being staked in the ground as shown in FIG. 23a.

Throughout the figures, the same parts are always denoted using the same reference characters so that, as a general rule, they will only be described once.

DETAILED DESCRIPTION OF EMBODIMENTS OF THE INVENTION

Figure 1:
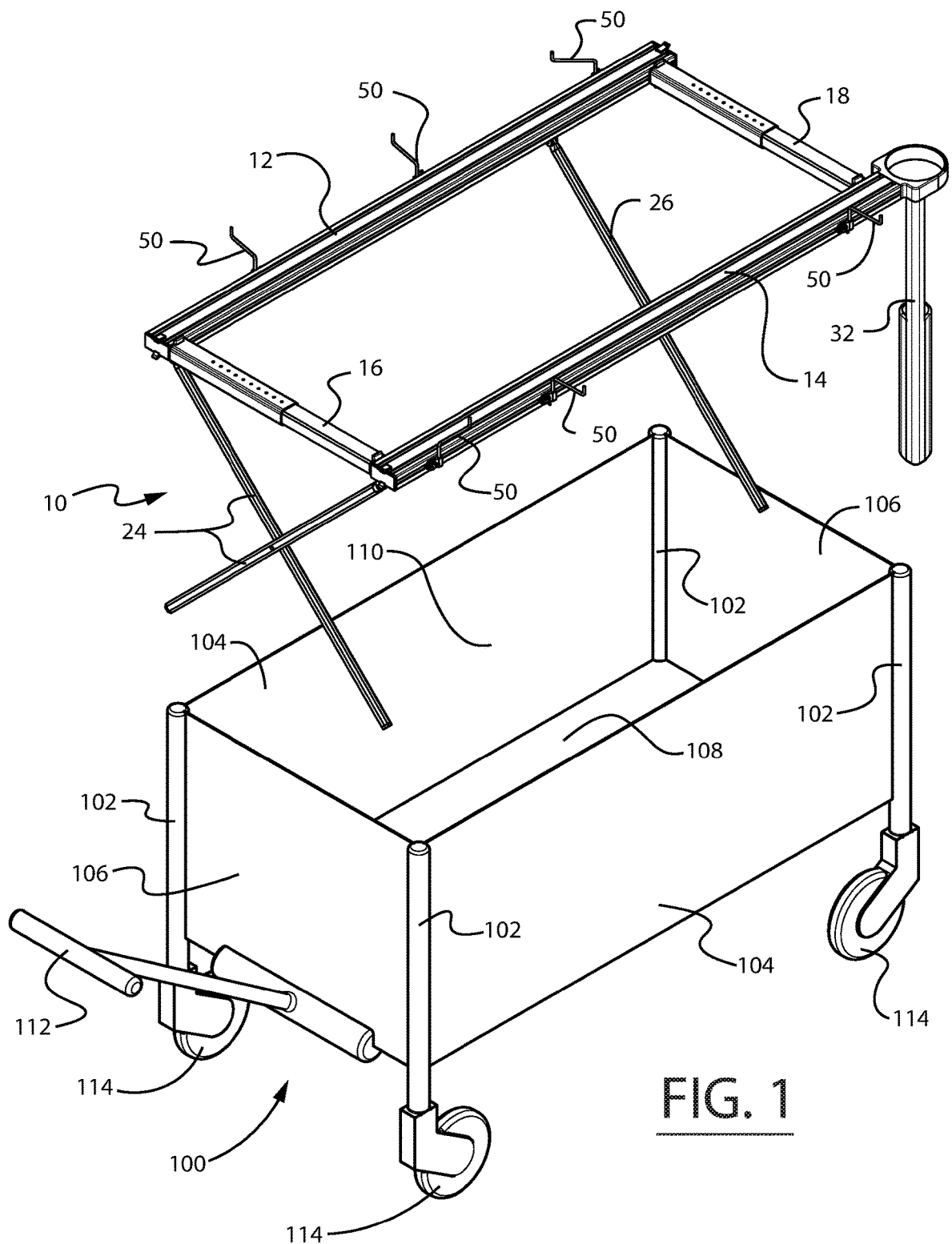
FIG. 1 is a perspective view of an adjustable wagon frame assembly shown prior to being installed inside a wagon bed of a pull-type wagon, according to an illustrative embodiment of the invention.

An illustrative embodiment of an adjustable wagon frame assembly is seen generally at 10 in FIGS. 1-7. Initially, as shown in the perspective view of FIG. 1, the illustrative adjustable wagon frame assembly 10 generally comprises a frame structure having a plurality of frame members 12, 14, 16, 18, 24, 26, the frame structure configured to fit at least partially inside a wagon bed 110 of a pull-type wagon 100 (e.g., pull-type utility or beach wagon—see FIG. 1), the frame structure configured to support one or more objects (e.g., an umbrella 130 and chairs 132—see FIGS. 17 and 18) proximate to a periphery of the wagon bed 110 so as to leave a central region of the wagon bed 110 open for transporting one or more additional objects (e.g., a cooler), one or more people, and/or one or more animals. In the illustrative embodiment, a plurality of the frame members 16, 18, 24, 26 are adjustable relative to the other frame members (see e.g., FIGS. 4, 13, and 14 so as to enable the frame structure to fit a plurality of wagon beds having different sizes. In the illustrative embodiment, the wagon frame assembly 10 described herein may be used with an existing wagon so as to make the wagon more versatile, and to enable the wagon to carry more items.

Figure 2:
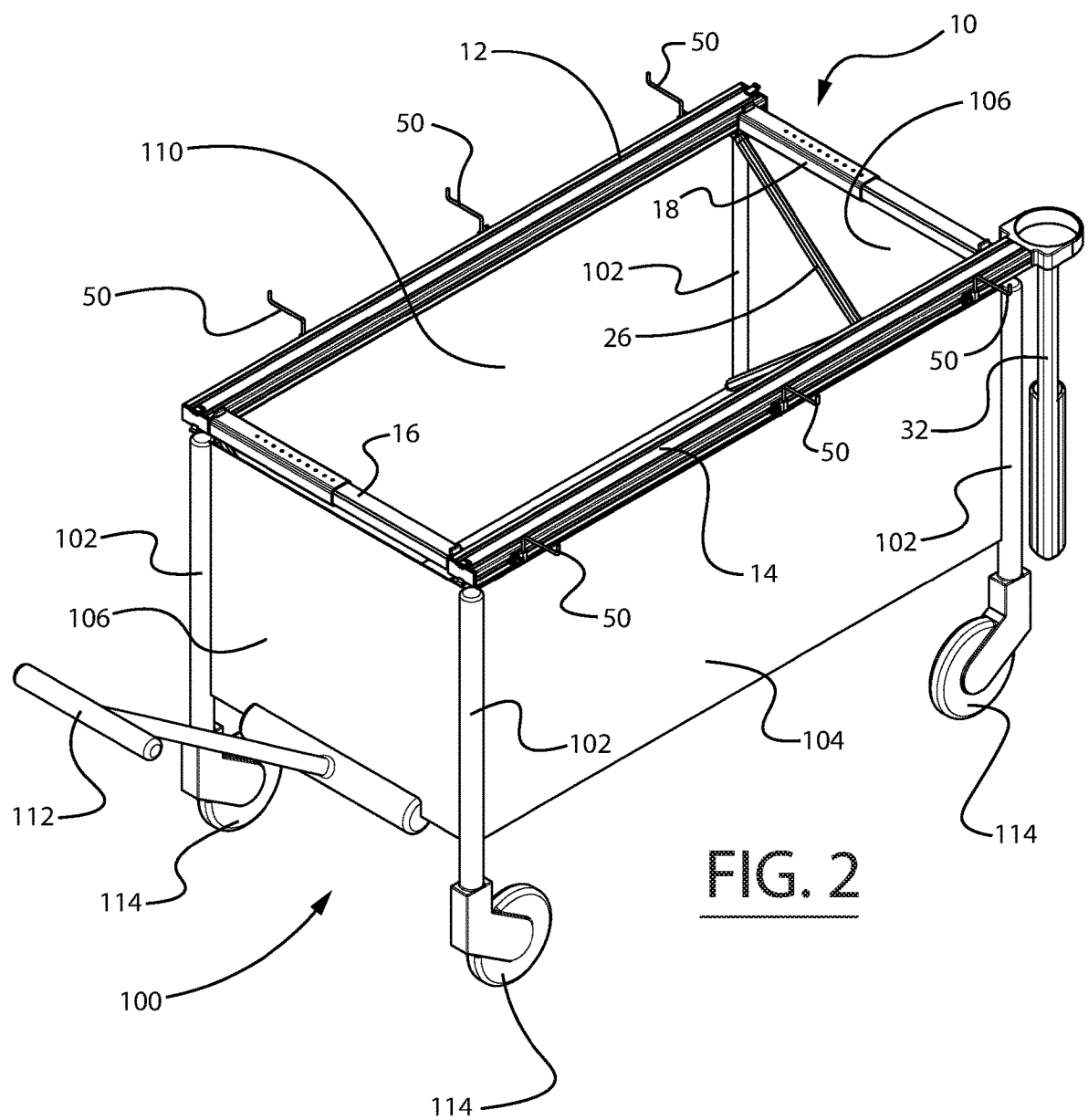
FIG. 2 is another perspective view of the adjustable wagon frame assembly of FIG. 1, wherein the adjustable wagon frame assembly is shown installed in the wagon bed of the pull-type wagon.

In the illustrative embodiment, the adjustable wagon frame assembly 10 may be provided as part of a wagon frame system (see FIGS. 1 and 2), wherein the wagon frame assembly 10 is inserted into the wagon bed 110 of a pull-type wagon 100. As shown in FIGS. 1 and 2, the pull-type wagon 100 may include a plurality of vertical frame members 102 with a wheel assembly 114 mounted at the bottom of each vertical frame members 102. The vertical frame members 102 of the pull-type wagon 100 support a pair of oppositely disposed longitudinal side panels 104 and a pair of oppositely disposed transverse side panels 106 (see FIG. 1). The pair of longitudinal side panels 104 and the pair of transverse side panels 106, together with a wagon floor 108, form the wagon bed 110 of the wagon 100. In the illustrative embodiment, the side panels 104, 106 may be formed from a fabric material, which is lightweight and flexible, but is not capable of supporting a load. As shown in FIGS. 1 and 2, the wagon bed 110 of the wagon 100 defines a rectangular storage compartment for transporting various cargo (e.g., coolers, blankets, clothing items, etc.). In addition, it can be seen that the illustrative wagon 100 further includes a graspable handle 112 for allowing a user to pull the wagon 100 behind him or her, and thus transport cargo using the wagon 100.

Figure 3:
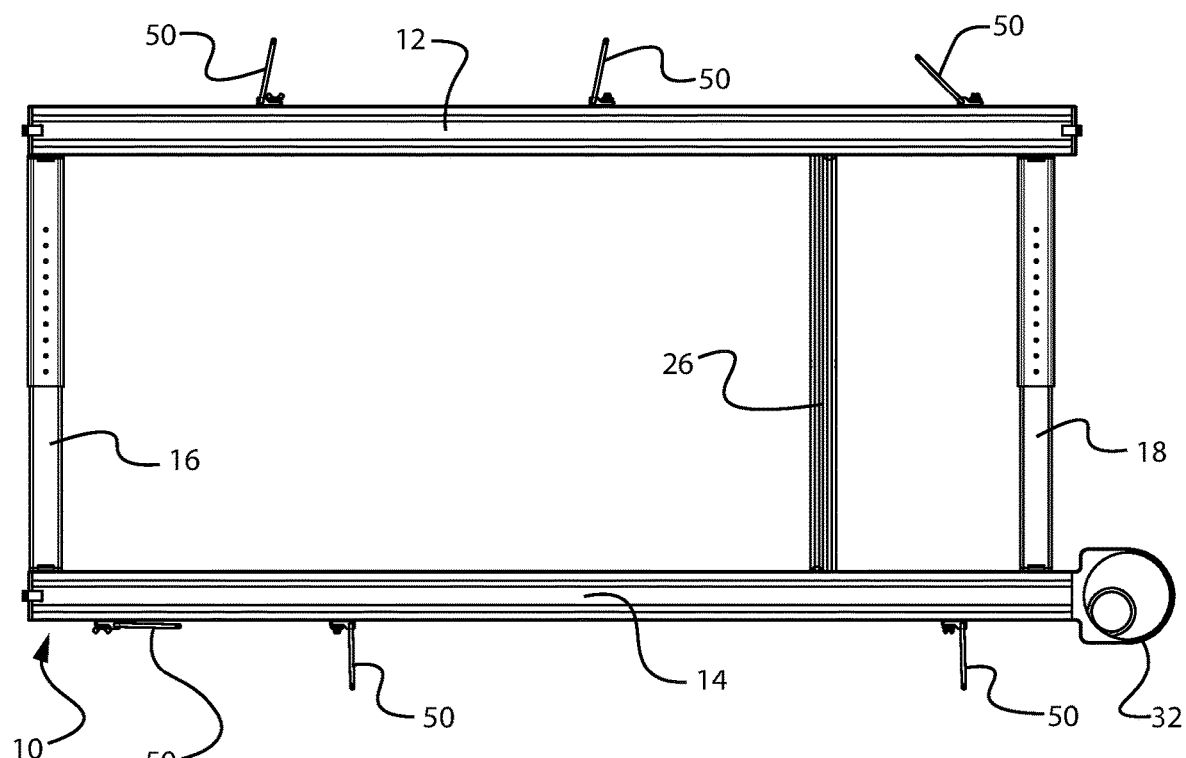
FIG. 3 is a top plan view of the adjustable wagon frame assembly of FIG. 1.
Figure 13:
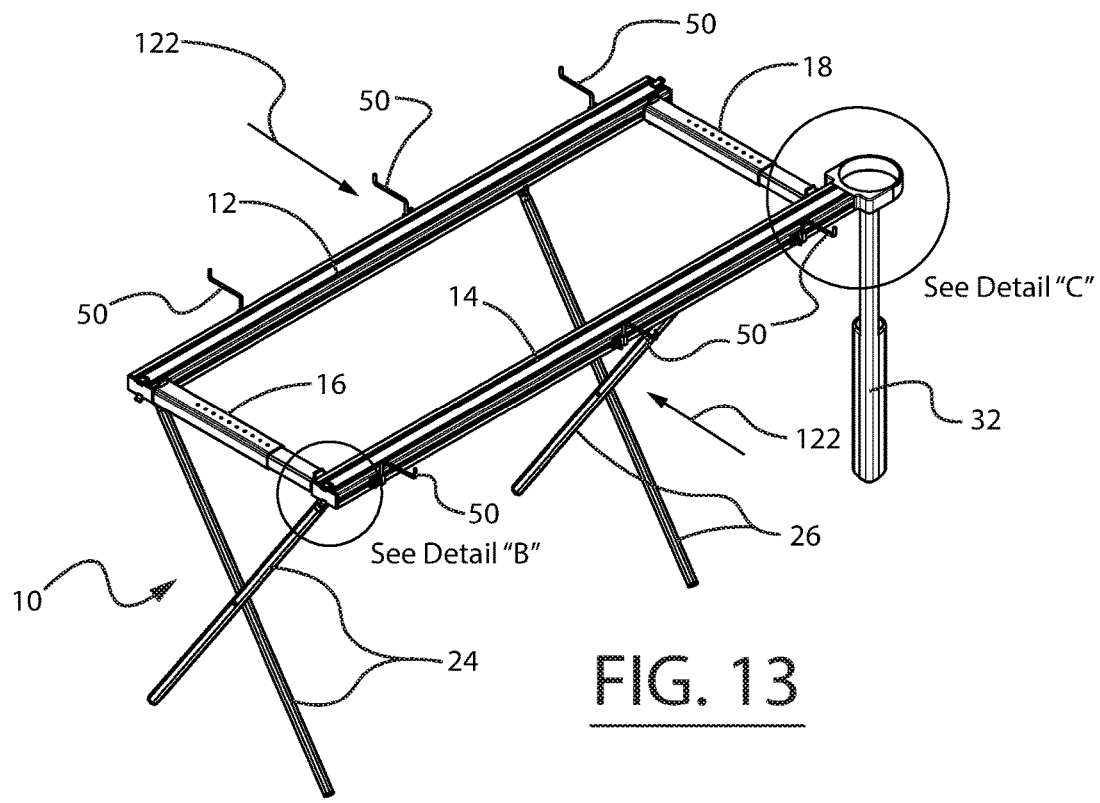
FIG. 13 is another perspective view of the adjustable wagon frame assembly of FIG. 1, wherein the adjustable wagon frame assembly is shown in its assembled state.
Figure 14:
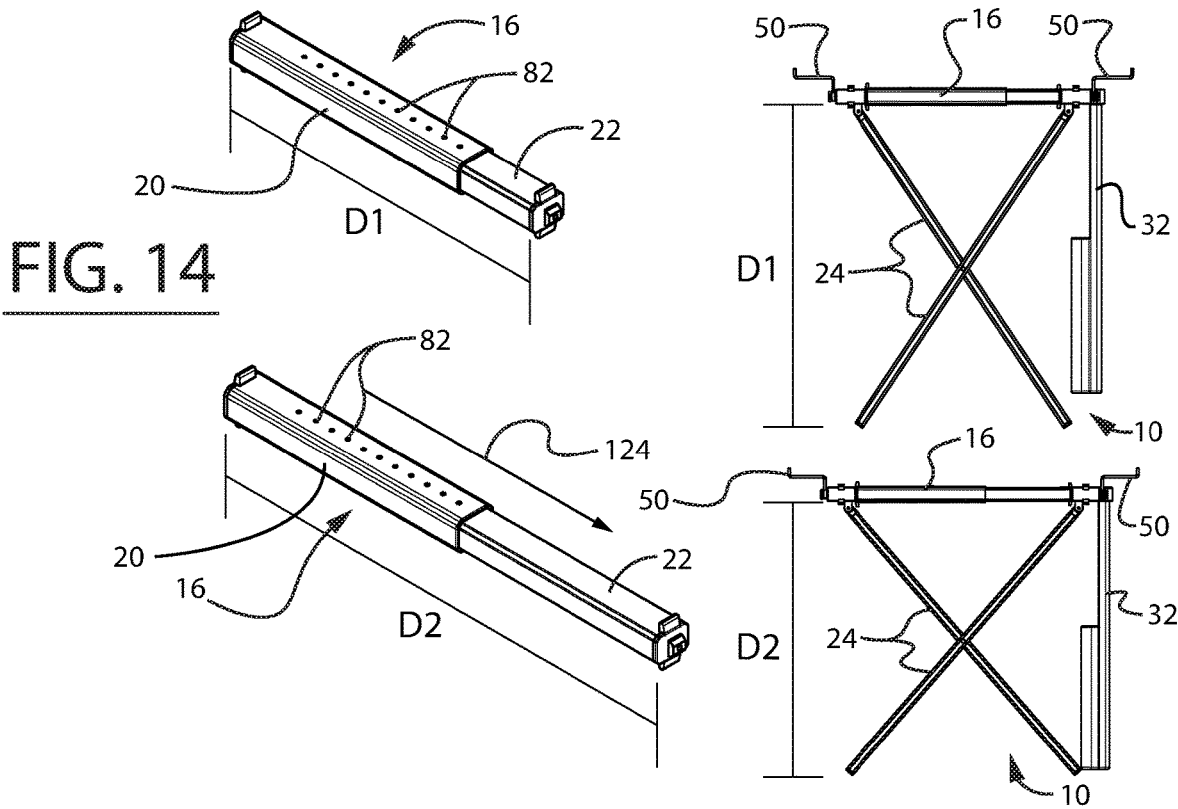
FIG. 14 illustrates the width and height adjustability of the adjustable wagon frame assembly of FIG. 1, which enables the frame assembly to fit a plurality of wagon beds having different sizes.

Now, referring again to FIGS. 1-7, the frame structure of the illustrative wagon frame assembly 10 will be described. Initially, as shown in FIGS. 1-3, it can be seen that the wagon frame assembly 10 comprises first and second longitudinal frame members 12, 14 together with first and second transverse frame members 16, 18 attached between the first and second longitudinal frame members 12, 14. As best shown in the top view of FIG. 3, in the illustrative embodiment, each of the longitudinal frame members 12, 14 is disposed generally perpendicular, or perpendicular to each of the transverse frame members 16, 18. Turning to FIGS. 13 and 14, it can be seen that each of the transverse frame members 16, 18 have an adjustable length (e.g., shorter length D1 or longer length D2—FIG. 14) so as to enable a width of the frame structure to be adjusted to accommodate the wagon beds having different sizes (e.g., different widths). More particularly, as shown in illustrative embodiment of FIG. 14, each of the transverse frame members 16, 18 includes an outer tubular member 20 and an inner telescoping tubular member 22 that is telescopically adjustable within the outer tubular member 20 so as to enable the operative length of the transverse frame members 16, 18 to be varied (e.g., between lengths D1 and D2 in FIG. 14). For example, in FIG. 13, the arrows 122 diagrammatically denote the inward transverse adjustment of the frame structure by means of the transverse frame members 16, 18 (i.e., reducing the width of the frame structure by means of decreasing the lengths of the transverse frame members 16, 18). Conversely, in FIG. 14, the arrow 124 diagrammatically denotes an increase in the length of the transverse frame member 16, which would result in the width of the frame structure being increased to accommodate a wagon bed having a larger width. Also, on the right side of FIG. 14, the effect of the change in the operative length (e.g., D1, D2) of the transverse frame members 16, 18 on the height of the wagon frame assembly 10 is illustrated. As shown in FIG. 14, in the illustrative embodiment, extending the length of the transverse frame members 16, 18 from D1 to D2 results in a consequential reduction in the height of the wagon frame assembly 10.

Figure 7:
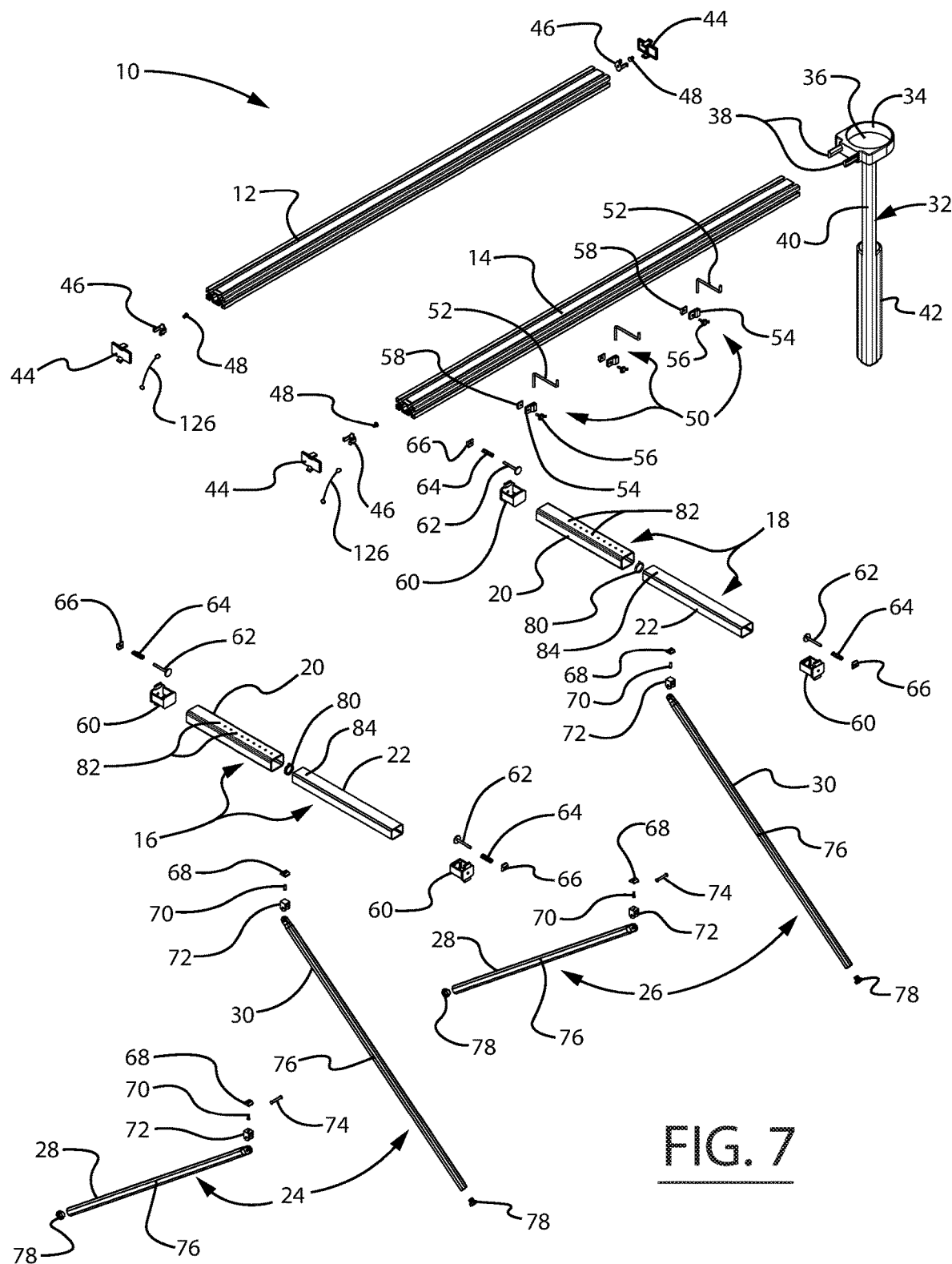
FIG. 7 is an exploded perspective view of the adjustable wagon frame assembly of FIG. 1.

As shown in the illustrative embodiment of FIGS. 7 and 14, to enable the lengthwise adjustment of the transverse frame members 16, 18, each outer tubular member 20 is provided with a plurality of longitudinally spaced-apart pin apertures 82 along a length thereof. A snap pin member 80 is provided in each inner telescoping tubular member 22 for engaging with a selected one of the spaced-apart pin apertures 82 in the outer tubular member 20, thereby fixing the position of the inner telescoping tubular member 22 relative to the outer tubular member 20 so as to determine the operative length of the transverse frame member 16 or 18. Each snap pin member 80 comprises a protruding detent that passes through a pin aperture 84 in the inner telescoping tubular member 22, and then through the selected one of the spaced-apart pin apertures 82 in the outer tubular member 20. Each snap pin member 80 may be formed from a resilient metallic material so that it snaps into place in the selected one of the pin apertures 82. In this manner, the length of each transverse frame member 16, 18 is able to be discretely adjusted.

Figure 8:
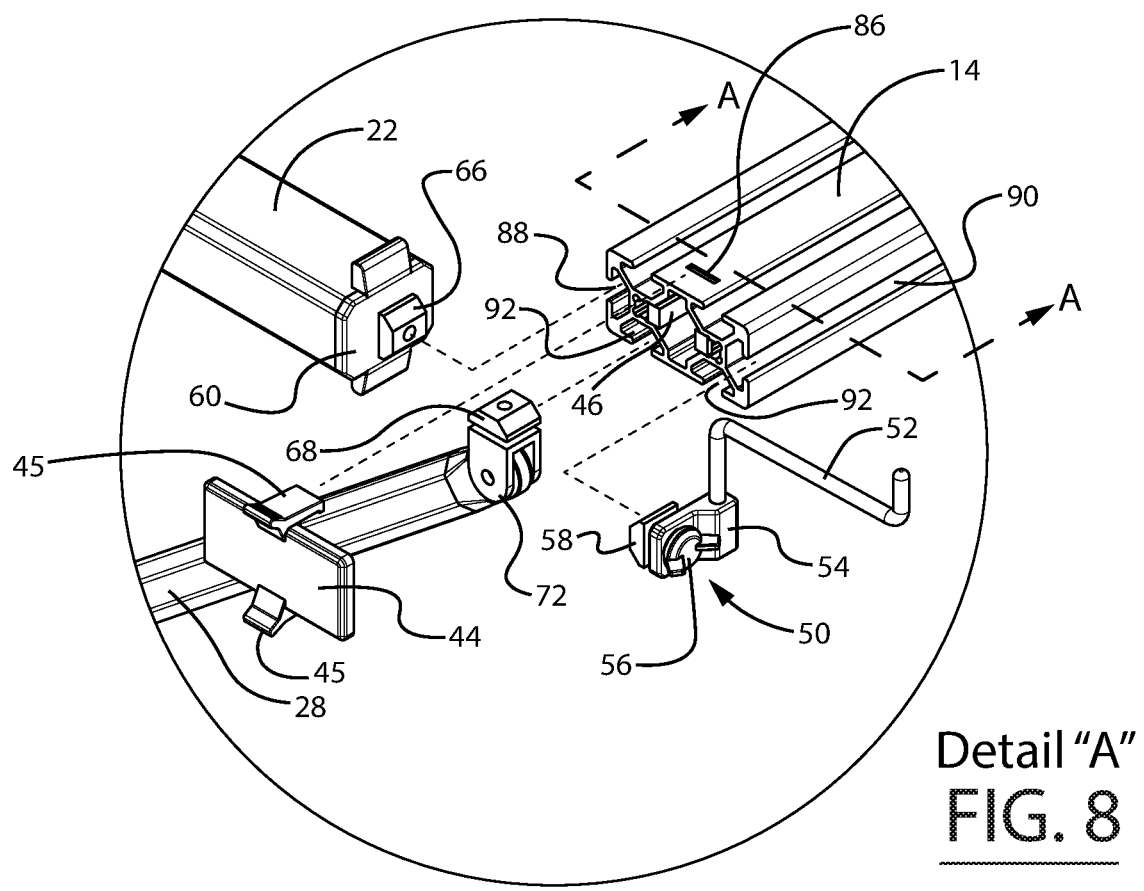
FIG. 8 is an enlarged exploded perspective view illustrating the component connections of the adjustable wagon frame assembly illustrated in FIG. 6 (Detail "A"), wherein the components are shown exploded from one another.
Figure 9:
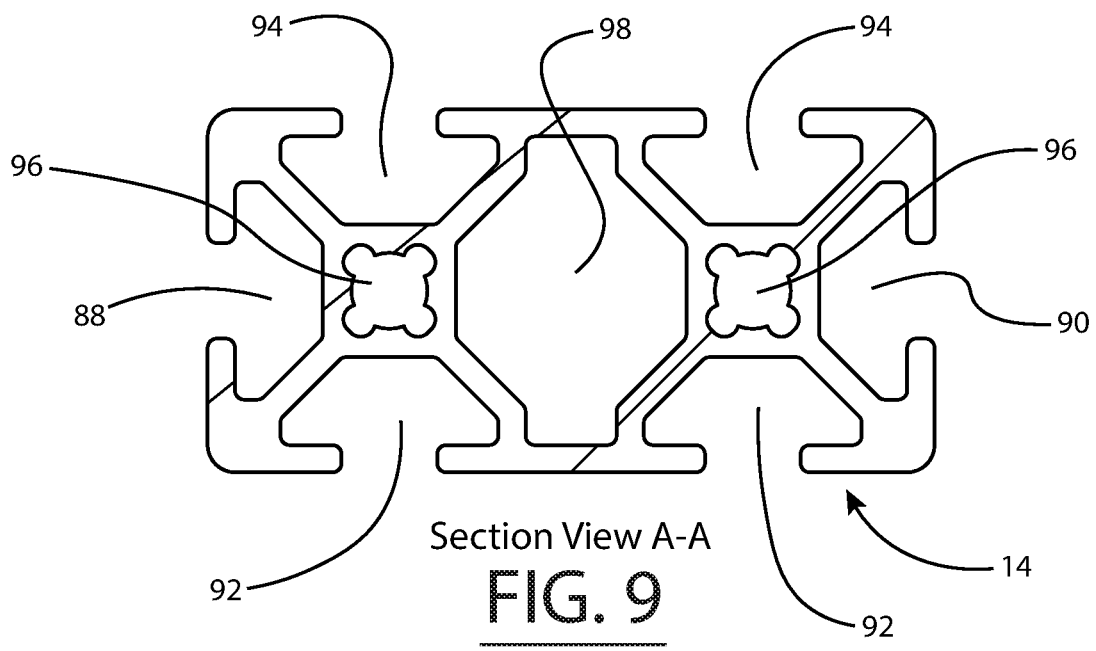
FIG. 9 is a transverse sectional view cut through one of the longitudinal frame members of the adjustable wagon frame assembly of FIG. 1, wherein the section is generally cut along the cutting-plane line A-A in FIG. 8.
Figure 15:
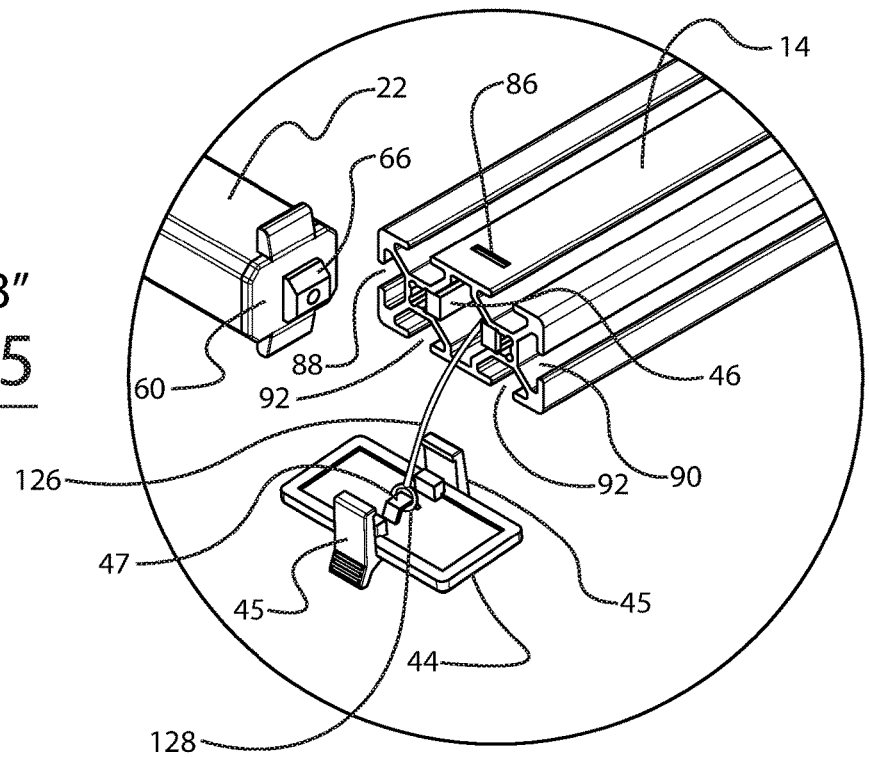
FIG. 15 is an enlarged perspective view illustrating the removable end cap of one of the longitudinal frame members of the adjustable wagon frame assembly illustrated in FIG. 13 (Detail "B")

In the illustrative embodiment, with combined reference to FIGS. 7, 8, and 15, it can be seen that each of the longitudinal frame members 12, 14 may comprise a T-slotted extrusion frame member with a plurality of T-slots 88, 90, 92, 94 formed in the sides thereof. More specifically, as shown in FIGS. 8, 9, and 15, the longitudinal frame member 14 comprises an inner side T-slot 88, an outer side T-slot 90, a pair of bottom T-slots 92, and a pair of top T-slots 94. Also, as best illustrated in the sectional view of FIG. 9, the longitudinal frame member 14 comprises a pair of small internal cavities 96 and a large internal cavity 98 disposed between the small internal cavities 96. The longitudinal frame member 12, which is a mirror image of the longitudinal frame member 14 in the illustrative embodiment, contains the same T-slots 88, 90, 92, 94 and internal cavities 96, 98 as the longitudinal frame member 14.

Referring collectively to the exploded view of view of FIG. 7 and the detail views of FIGS. 8 and 15, it can be seen that, in the illustrative embodiment, each of the longitudinal frame members 12, 14 comprises a removable end cap 44 at each of the oppositely disposed longitudinal ends thereof. The end caps 44 are detachably connected to ends of the longitudinal frame members 12, 14 so as to enable a variety of different accessories (e.g., the umbrella holster 32 and chair hooks 52 described hereinafter) to be selectively attached to, and detached from, the longitudinal frame members 12, 14. Referring again to FIGS. 7, 8, and 15, it can be seen that each removable end cap 44 comprises a pair of spaced-apart resilient latch members 45 that removably engage corresponding end cap latch slots 86 in the top and bottom sides of the longitudinal frame members 12, 14. That is, in the illustrative embodiment, the end caps 44 may be formed from a resilient polymeric material or plastic so that the latch members 45 snap into place in the slots 86 of the longitudinal frame members 12, 14. To disengage the latch members 45 from the slots 86, a user simply presses down on the raised end tab of each latch member 45 so as to rotate the protruding end of the latch member 45 upwardly, thus disengaging the protruding end of the latch member 45 from the slot 86. Then, the end cap 44 is able to be removed from the longitudinal frame member 12 or 14. As shown in FIG. 15, in order to prevent the removable end caps 44 from becoming inadvertently lost by the user, each end cap 44 is attached to the end of the longitudinal frame member 12 or 14 by an end cap cord 126. In the illustrative embodiment, the first end of the end cap cord 126 is attached to the end of the longitudinal frame member 12 or 14 by means of an end cap retention clip 46 with retention member fastener 48, while the second, opposite end of the end cap cord 126 is attached to a cord attachment loop 47 on the backside of the end cap 44 by means of a cord ring member 128 disposed on the end of the second end of the end cap cord 126.

In the illustrative embodiment, turning again to the exploded view of view of FIG. 7 and the detail views of FIGS. 8 and 15, it can be seen that each of the transverse frame members 16, 18 comprises an end cap 60 at each of the oppositely disposed longitudinal ends thereof. More specifically, the outer ends of the inner and outer tubular members 20, 22, which form each of the transverse frame members 16, 18, are provided with end caps 60 therein. As shown in FIG. 7, each end cap 60 of the transverse frame members 16, 18 is provided with a spring-loaded slidable engagement member 66 that is configured to slidingly engage with the inner side T-slots 88 of the longitudinal frame members 12, 14. The sliding engagement between the engagement members 66 of the transverse frame members 16, 18 and the inner side T-slots 88 of the longitudinal frame members 12, 14 advantageously allows the transverse frame members 16, 18 to be slid along the length of the longitudinal frame members 12, 14 so as to enable the positions of the transverse frame members 16, 18 to be adjusted by the user. As shown in the exploded view of FIG. 7, each of the engagement members 66 are attached to their respective end caps 60 by means of an end cap pin member 62. A spring member 64 is provided on each end cap pin member 62 so as to bias the engagement members 66 into frictional contact with the outer surface of the T-slots 88 of the longitudinal frame members 12, 14 so as to prevent the inadvertent movement of the transverse frame members 16, 18 relative to the longitudinal frame members 12, 14. When a user wants to adjust a position of one of the transverse frame members 16, 18, he or she pulls axially outwardly on the transverse frame member 16 or 18, thus compressing the spring member 64 and disengaging the contact between the engagement member 66 and the surface of the T-slot 88 and/or the contact between the end cap 60 and the longitudinal frame member 12, 14, so that the transverse frame member 16 or 18 can be slid relative to the longitudinal frame members 12, 14.

With reference to FIGS. 1 and 5-7, it can be seen that the frame structure of the illustrative wagon frame assembly 10 further comprises first and second leg structures 24, 26. As shown in these figures, each of the first and second leg structures 24, 26 includes a pair of diagonal leg members 28, 30 arranged in a scissors-like configuration. The leg members 28, 30 of each leg structure 24, 26 pivot about a centrally located pivot pin 74 (e.g., a pop rivet), which is received within a pivot pin aperture 76 provided in each of the leg members 28, 30. When the wagon frame assembly 10 is inserted into the wagon bed 110 of the wagon 100 (see e.g., FIG. 2), the first and second leg structures 24, 26 elevate the longitudinal frame members 12, 14 and the transverse frame members 16, 18 above a top surface of the wagon bed 110 such that a portion of the frame structure protrudes above the sides 104, 106 of the wagon bed 110. That is, the first and second leg structures 24, 26 are configured to rest on the bed floor 108 of the wagon bed 110 so that the sides of the longitudinal frame members 12, 14 protrude above the plurality of sides 104, 106 of the wagon bed 110.

Figure 4:
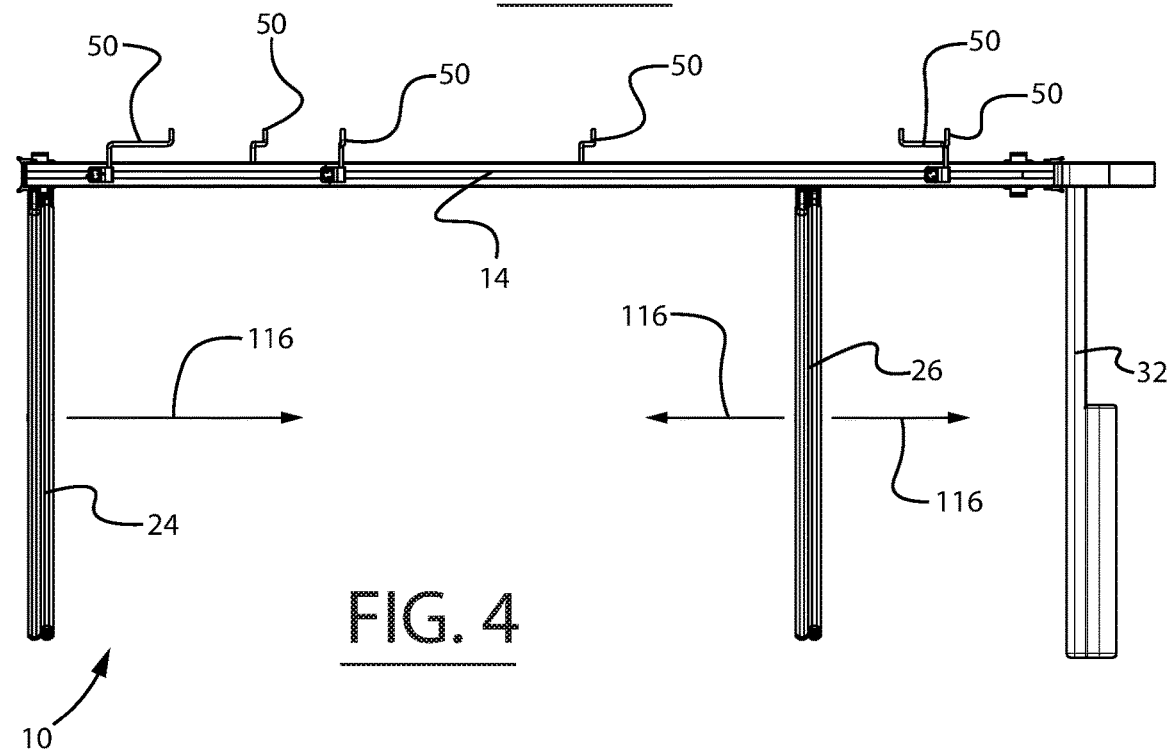
FIG. 4 is a side elevational view of the adjustable wagon frame assembly of FIG. 1, wherein the adjustability of the leg members is illustrated.
Figure 5:
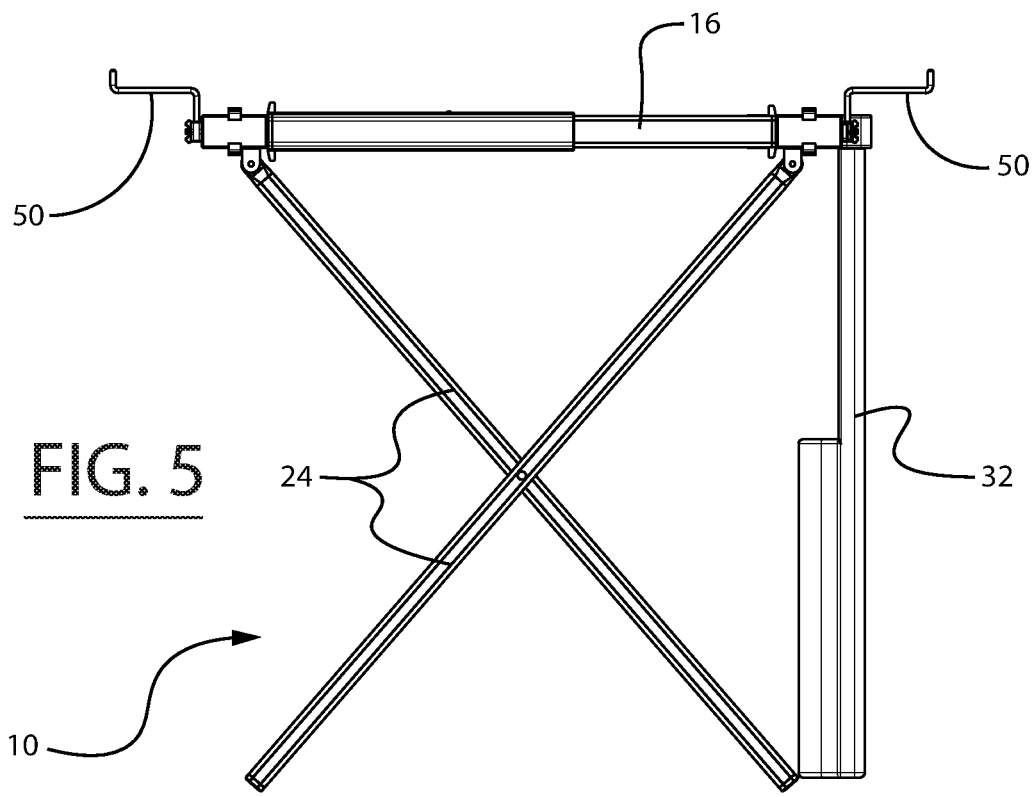
FIG. 5 is a first end view of the adjustable wagon frame assembly of FIG. 1.
Figure 6:
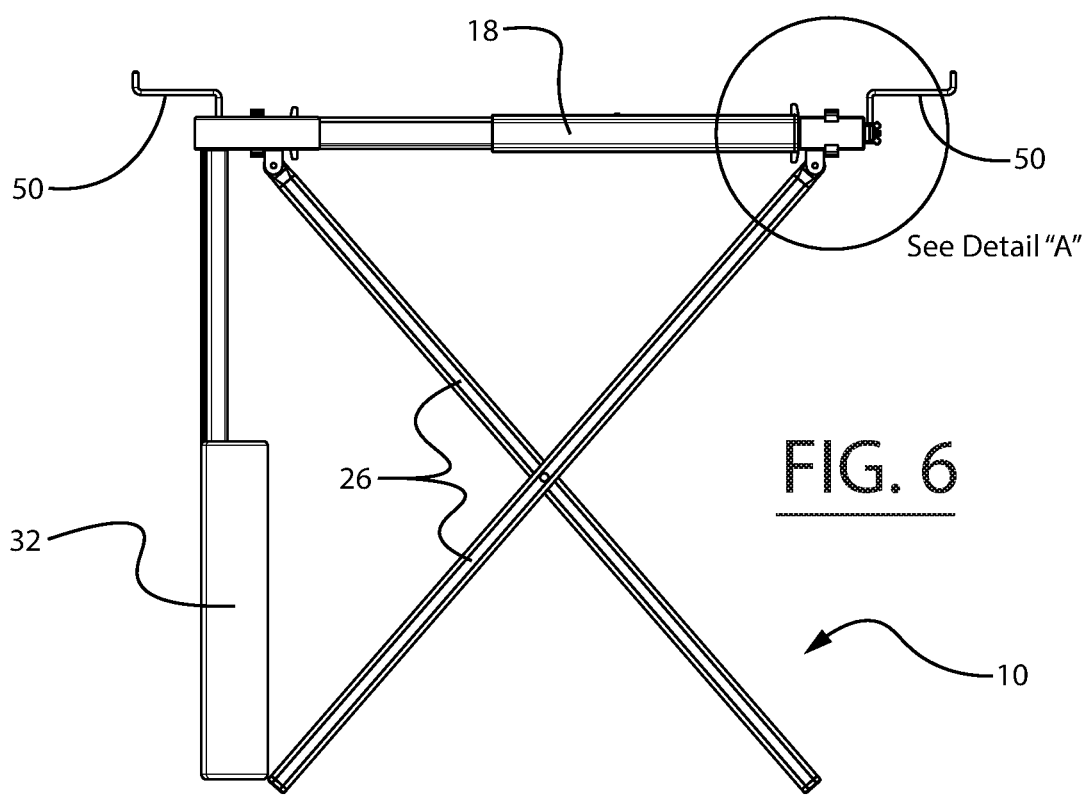
FIG. 6 is a second end view of the adjustable wagon frame assembly of FIG. 1.

As shown in FIG. 4, in the illustrative embodiment, each of the first and second leg structures 24, 26 is adjustably attached to longitudinal frame members 12, 14 so as to accommodate the wagon beds having different sizes (i.e., different lengths). More particularly, as diagrammatically denoted by the arrows 116 in FIG. 4, each of the first and second leg structures 24, 26 may be slidably displaced along a length of the longitudinal frame members 12, 14. As shown in FIGS. 7 and 8, a slidable engagement member 68, which is configured to slidingly engage with one of the bottom T-slots 92 of the longitudinal frame members 12, 14, is provided proximate to the top end of each of the leg members 28, 30. The sliding engagement between the engagement members 68 of the leg members 28, 30 and bottom T-slots 92 of the longitudinal frame members 12, 14 advantageously allows the first and second leg structures 24, 26 to be slid along the length of the longitudinal frame members 12, 14 so as to enable the positions of the first and second leg structures 24, 26 to be adjusted by the user. As shown in FIGS. 7 and 8, the engagement members 68 are attached to the top ends of their respective leg members 28, 30 by means of pin member 70 and a leg connector member 72. In the illustrative embodiment, as shown in FIGS. 7 and 8, the leg connector member 72 is in the form of a yoke-type bracket that enables the top end of each leg member 28, 30 to pivot relative to its respective leg connector member 72 so as to enable the scissors-like configuration of the first and second leg structures 24, 26. As shown in FIG. 7, the opposite, bottom end of each leg member 28, 30 is provided with a leg end cap 78 so as to close the open end of each tubular leg member 28, 30.

In the illustrative embodiment, the frame members 12, 14, 16, 18 and the leg structures 24, 26 of the wagon frame assembly 10 are formed from a suitable rigid or semi-rigid material (e.g., a suitable metal or plastic).

Figure 19:
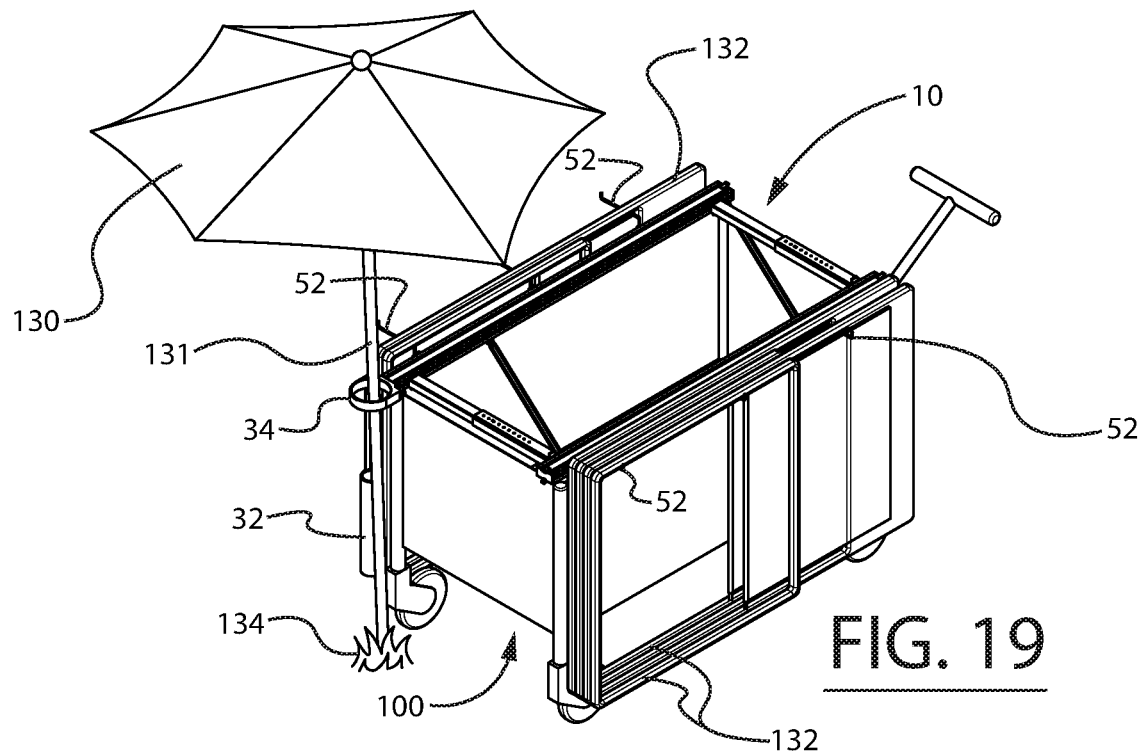
FIG. 19 is another perspective view similar to that of FIGS. 17 and 18, except that the lower end of the umbrella is staked into the ground rather being supported by the bottom cylindrical member of the umbrella holster.

Next, with particular reference to FIGS. 1, 7, and 8, the hook members 52 of the illustrative wagon frame assembly 10 will be explained. As shown in the perspective view of FIG. 1, the hook members 52 are coupled to the outer sides of the longitudinal frame members 12, 14. Each of the hook members 52 is configured to support one or more hanging objects (e.g., chairs 132, as depicted in FIGS. 17-19) on a side of the wagon bed 110. In FIG. 2, it can be seen that the hook members 52 extending outwardly from the outer sides of the longitudinal frame members 12, 14 in a cantilevered manner above a top edge of the longitudinal sides 104 of the wagon bed 110 so that objects (e.g., chairs 132) are capable of being hung on the sides of the wagon bed 110 of the wagon 100. As best shown in FIGS. 7 and 8, in the illustrative embodiment, each of the hook members 52 is provided as part of a hook subassembly 50 that is adjustably connected to the longitudinal frame members 12, 14 so as to enable a position of each hook member 52 to be adjusted. More particularly, each of the hook members 52 may be slidably displaced along a length of the longitudinal frame members 12, 14. As shown in FIGS. 7 and 8, a slidable engagement member 58, which is configured to slidingly engage with the outer side T-slot 90 of the longitudinal frame members 12, 14, is provided proximate to the bottom end of each of the hook members 52. The sliding engagement between the engagement members 58 of the hook members 52 and the side T-slots 90 of the longitudinal frame members 12, 14 advantageously allows the hook members 52 to be slid along the length of the longitudinal frame members 12, 14 so as to enable the positions of the hook members 52 to be adjusted by the user so as to accommodate the hanging of objects having different shapes and sizes from the wagon frame assembly 10. As shown in FIGS. 7 and 8, the engagement members 58 are attached to the bottom ends of their respective hook members 52 by means of a hook base member 54 and a fastener member 56. In the illustrative embodiment, as shown in FIGS. 7 and 8, the fastener member 56 is hand twist-type threaded fastener that does not require a user to use a tool for tightening and loosening the fastener 56. As such, when the user wants to adjust a position of one of the hook members 52, he or she simply loosens the fastener member 56 by rotating the fastener 56 in a loosening direction with his or her fingers, and then slides the hook members 52 along the length of the longitudinal frame member 12 or 14 to its desired position. Then, to fix the position of the hook member 52 relative to the longitudinal frame member 12 or 14, he or she simply tightens the fastener member 56 by rotating the fastener 56 in a tightening direction with his or her fingers, which frictionally engages the engagement members 58 with the side surface of the T-slot 90. Advantageously, the hook members 52 are able to be selectively positioned on the wagon frame assembly 10 in the locations most convenient for the user (e.g., in particular locations along the sides of the longitudinal frame members 12, 14) by removably attaching the hook subassemblies 50 to the outer side T-slots 90 of the longitudinal frame members 12, 14.

In the illustrative embodiment, as best shown in FIGS. 1 and 3, each of the hook members 52 of the hook assemblies 50 is pivotably coupled to the hook base member 54 about a vertical pivotal axis so as to enable the hook members 52 to be rotated between an operative position (e.g., generally perpendicular to the longitudinal frame member 12 or 14) and a stowed position (e.g., generally parallel to the longitudinal frame member 12 or 14). As such, when the hook members 52 are not being used for hanging objects (e.g., chairs) on the side of the wagon bed 110, the hook members 52 advantageously are able to be rotated out of the way.

Figure 16:
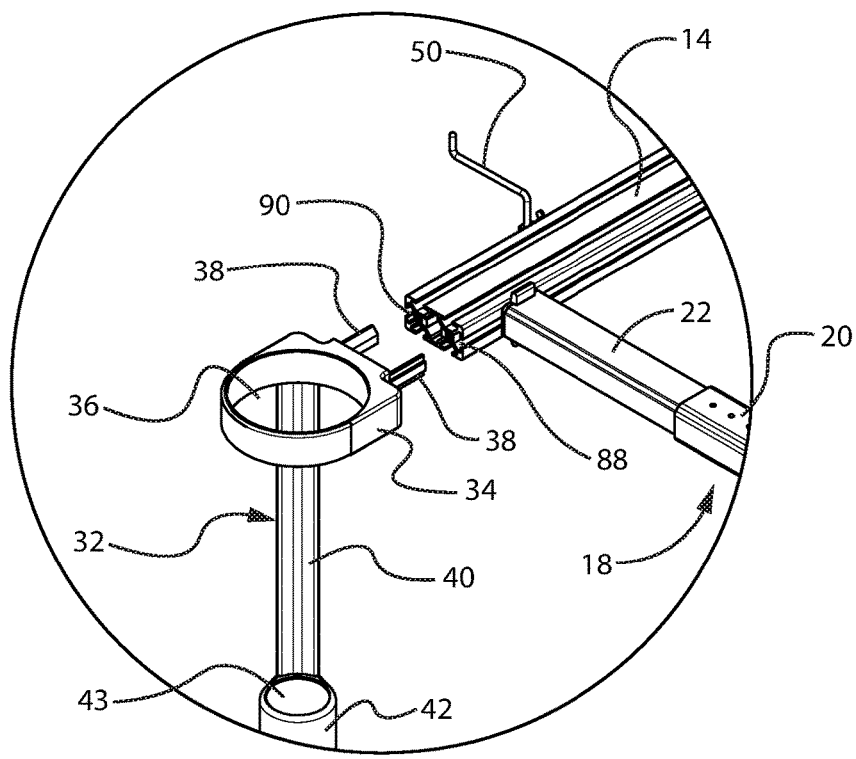
FIG. 16 is an enlarged perspective view illustrating the removable umbrella holster of the adjustable wagon frame assembly illustrated in FIG. 13 (Detail "C")

Finally, referring to FIGS. 1, 7, and 16-18, the umbrella holster 32 of the illustrative wagon frame assembly 10 will be described. As particularly shown in FIGS. 17 and 18, the umbrella holster 32 is configured to support an umbrella (e.g., a sport umbrella 130) in an upright position on the frame structure. As will be explained in detail hereinafter, in the illustrative embodiment, the umbrella holster 32 is removably coupled to the end of one of the longitudinal frame members 12 or 14. With particular reference to the illustrative embodiment of FIGS. 7 and 16, it can be seen that the umbrella holster 32 comprises a lower holster portion 42 and an upper annular portion 34. The upper annular portion 34 of the umbrella holster 32 defines a central aperture 36, and the lower holster portion 42 defines a cylindrically shaped umbrella passageway 43 (see FIG. 16). As shown in FIGS. 7 and 16, the lower holster portion 42 of the umbrella holster 32 is attached to the upper annular portion 34 by a vertical spine member 40. With reference to FIGS. 17 and 18, it can be seen that the lower portion of the umbrella shaft 131 of umbrella 130 is received within the cylindrically shaped umbrella passageway 43 of the lower holster portion 42, while the upper portion of the umbrella shaft 131 is received within the central aperture 36 of the upper annular portion 34 of the umbrella holster 32.

In the illustrative embodiment, with reference to FIG. 16, it can be seen that the upper annular portion 34 of the umbrella holster 32 is provided with a pair of outwardly extending protrusions 38 for removably attaching the umbrella holster 32 to the longitudinal frame member 14 (or alternatively longitudinal frame member 12). More particularly, the pair of outwardly extending protrusions 38 of the umbrella holster 32 are slidingly received within the oppositely disposed side T-slots 88, 90 of the longitudinal frame member 14 (or alternatively of the longitudinal frame member 12) in a friction fit-type arrangement. When it is desired to remove the umbrella holster 32 from the wagon frame assembly 10, a user grasps the upper annular portion 34 of the umbrella holster 32, and pulls the umbrella holster 32 outwardly so as to overcome the frictional engagement between the T-slots 88, 90 of the longitudinal frame member 14 or 12 and the protrusions 38 of the umbrella holster 32. Then, the user is able to cover the exposed end of the longitudinal frame member 14 or 12 with its associated end cap 44. Advantageously, the umbrella holster 32 is able to be selectively positioned on the wagon frame assembly 10 in the location most convenient for the user (e.g., in a selected one of the four corners of the frame assembly 10) by removably attaching the umbrella holster 32 to one of the ends of the longitudinal frame members 12, 14.

Figure 10:
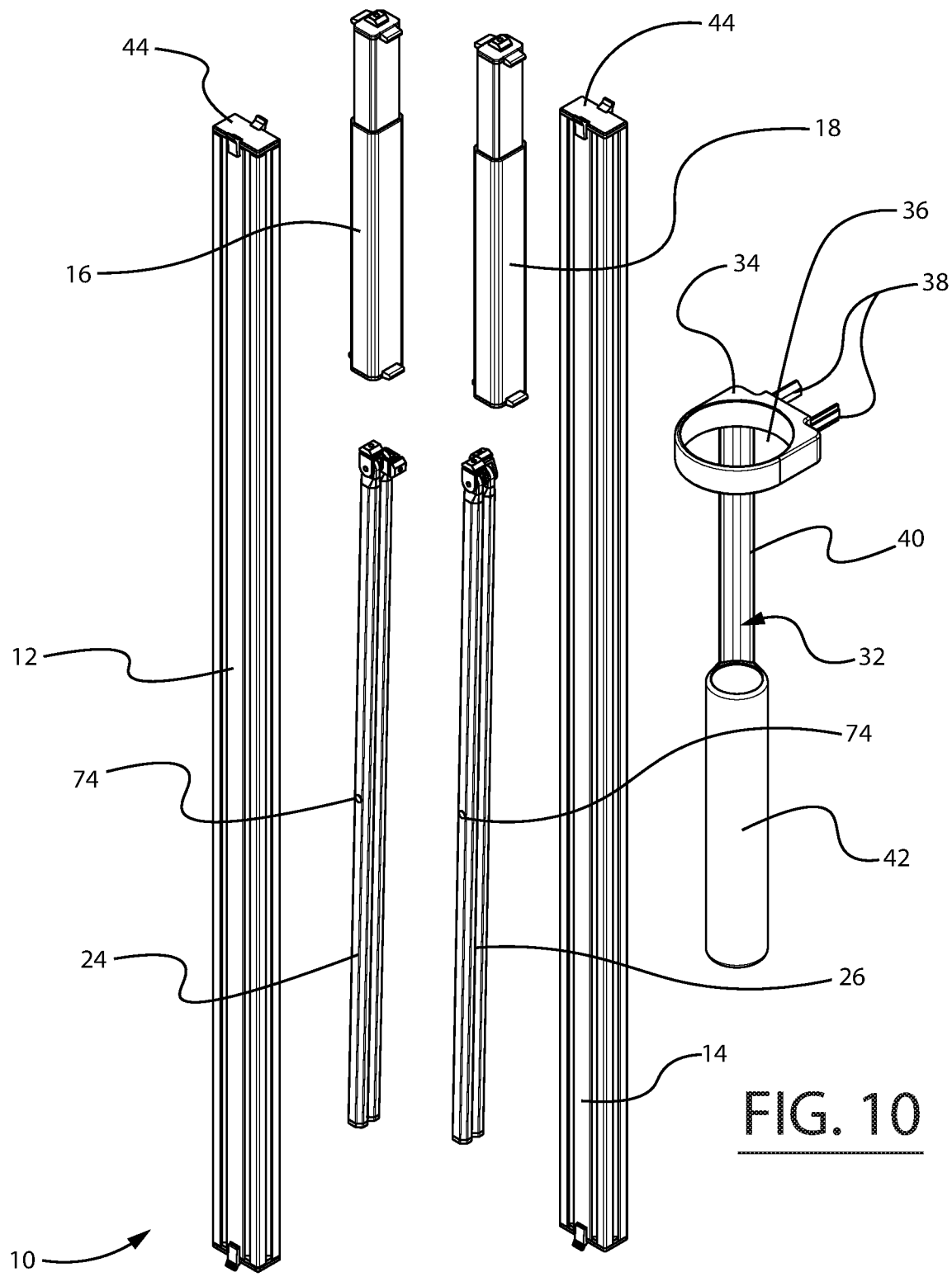
FIG. 10 is a perspective view of the disassembled components that form the adjustable wagon frame assembly of FIG. 1.

In the illustrative embodiment, the wagon frame assembly 10 is at least partially collapsible so as to make the frame structure more compact for the storage and transportation thereof. For example, by disengaging the snap pin members 80, the first and second transverse frame members 16, 18 are able to telescopically shortened to their shortest length, while the leg members 28, 30 of the first and second leg structures 24, 26 are able to pivoted to their most compact position. Also, in the illustrative embodiment, with reference to FIGS. 10-12, it can be seen that the wagon frame assembly 10 is capable of being disassembled so as to make the frame structure even more compact for the storage and transportation thereof. In particular, when a user wants to disassemble the wagon frame assembly 10, he or she removes the end caps 44 from the ends of the longitudinal frame members 12, 14, which allows the first and second transverse frame members 16, 18 and the first and second leg structures 24, 26 to be disassembled from the longitudinal frame members 12, 14 (see FIGS. 8 and 15). Also, as explained above, the umbrella holster 32 and the hook assemblies 50 may also be removed from the longitudinal frame members 12, 14, thus obtaining the disassembled state of the wagon frame assembly 10 depicted in FIG. 10. After the wagon frame assembly 10 has been completely disassembled, the user may arrange the components in a compact state, such as that illustrated in FIG. 11, and then stow the disassembled components of the wagon frame assembly 10 in an elongate storage bag 118 with drawstring 120 for closing the top end of the storage bag 118. Advantageously, the storage bag 118 allows the disassembled wagon frame assembly 10 to be easily transported and stored without occupying too much space.

Figure 20:
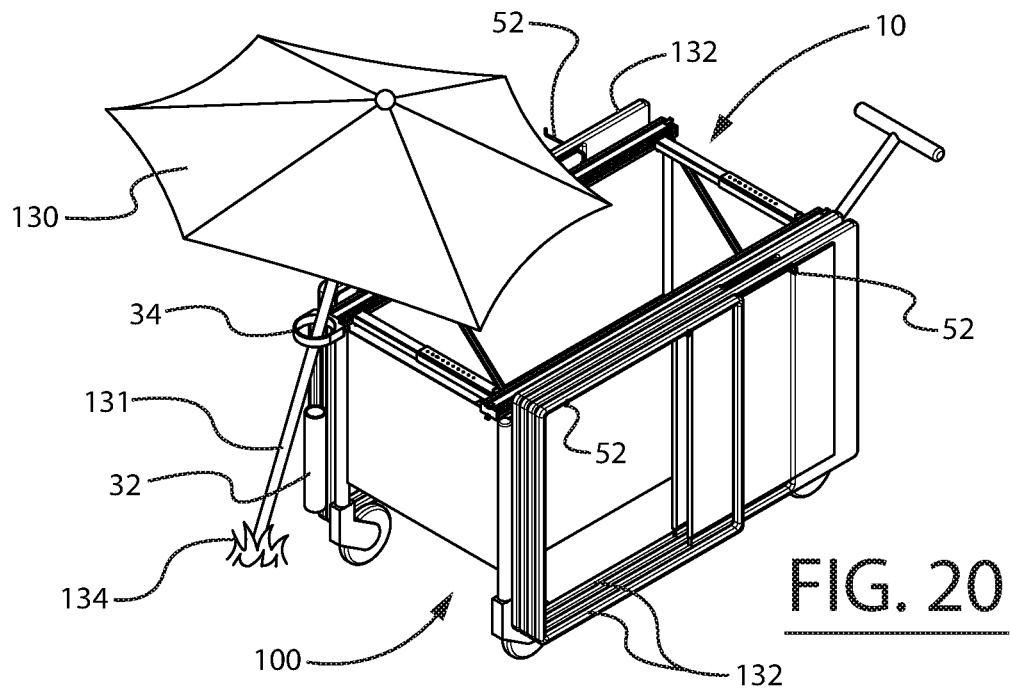
FIG. 20 is a perspective view similar to that of FIG. 19, except that the umbrella, which is staked into the ground, is disposed at an angle rather than being generally straight.
Figure 21:
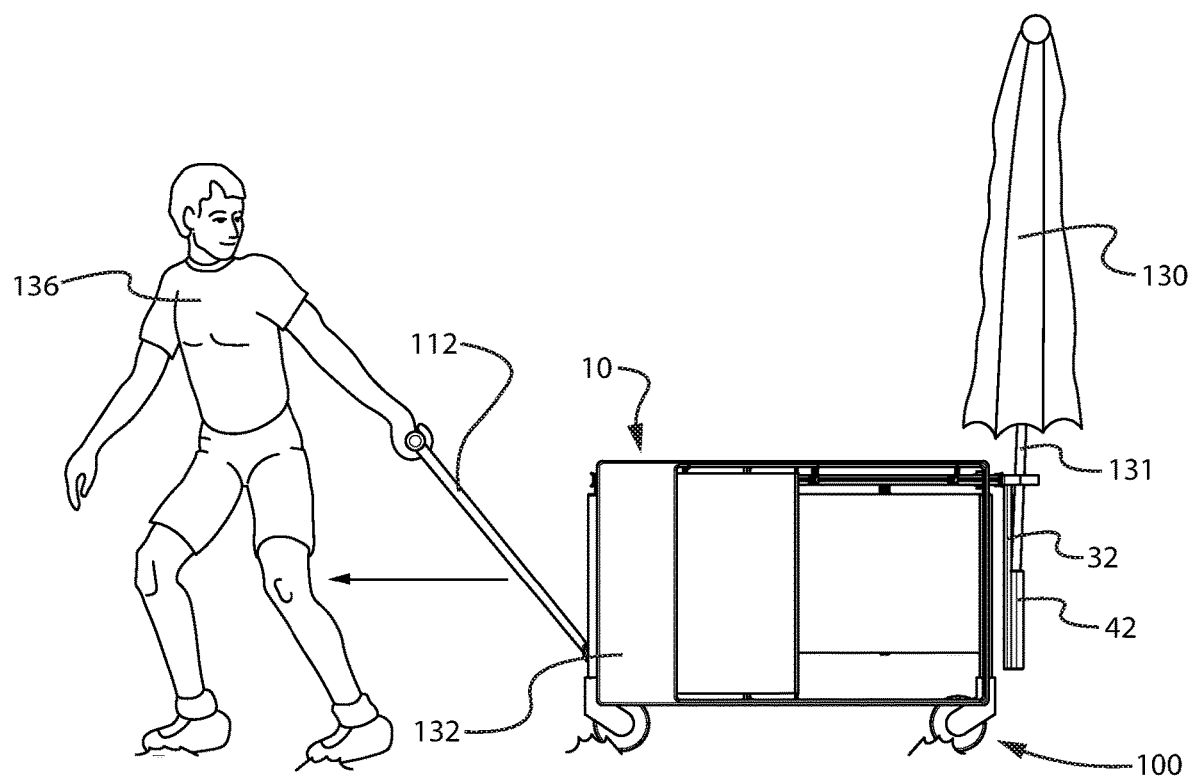
FIG. 21 is a perspective view illustrating a user pulling the wagon and cargo shown in FIGS. 17-20.
Figure 22:
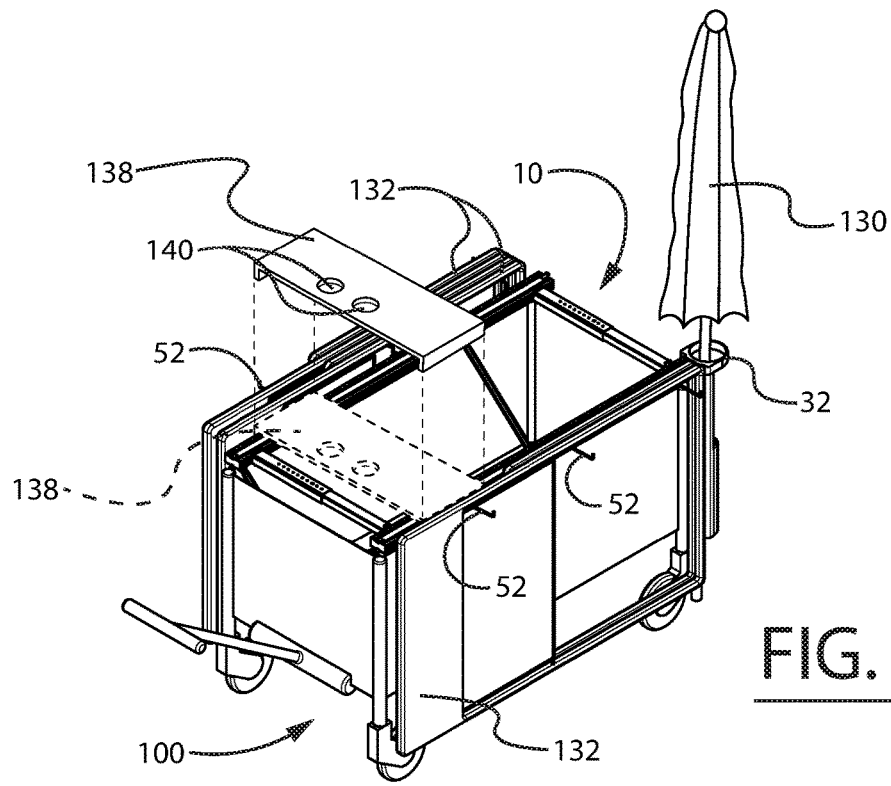
FIG. 22 is a perspective view similar to that of FIG. 17, except that the wagon frame assembly is shown being used to support tabletop members thereon.

Now, with reference to FIGS. 17-22, exemplary uses for the wagon frame assembly 10 described above will be explained. As shown in these figures, the wagon frame assembly 10, which has been inserted into the wagon 100, may be used to support a plurality of chairs 132 and an umbrella 130 about the periphery of the wagon 100 so that the vast majority of the wagon bed 110 is still available for carrying other items (e.g., a cooler, other chairs, clothing, etc.). In FIG. 18, one of the chairs 132 is shown disposed in an operative position for use. In FIGS. 19 and 20, the shaft 131 of the umbrella 130 is shown staked into the ground 134 for use while the wagon 100 is stationary and parked at a particular location (e.g., on the sidelines of a field during an outdoor sporting event). As shown in FIGS. 19 and 20, when the umbrella 130 is staked into the ground 134, the upper portion of the umbrella shaft 131 is advantageously able to be supported by the upper annular portion 34 of the umbrella holster 32. Turning to FIG. 21, a user 136 can be seen pulling the wagon 100 with the handle 112, while the chairs 132 are supported on the sides of the wagon 100 and the collapsed umbrella 130 is being supported within the umbrella holster 32. Finally, as shown in FIG. 22, removable tabletop accessories 138 for the wagon frame assembly 10 are illustrated. As shown in FIG. 22, the tabletop members 138 with built-in cup recesses 140 may removably attach to the top of the wagon frame assembly 10 so that the wagon 100 may advantageously be used as a portable picnic table.

Figure 23A:
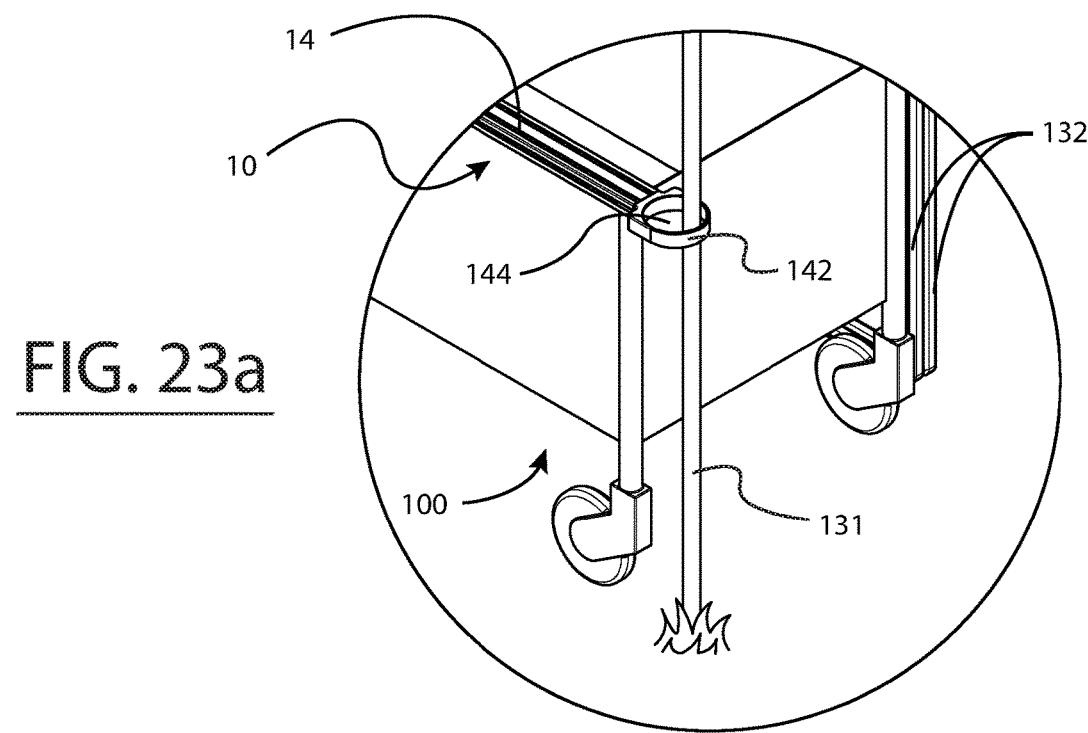
FIG. 23a is a partial perspective view of the adjustable wagon frame assembly shown installed in the wagon bed of the pull-type wagon, wherein an alternative embodiment of the umbrella support of the adjustable wagon frame assembly is illustrated.
Figure 23B:
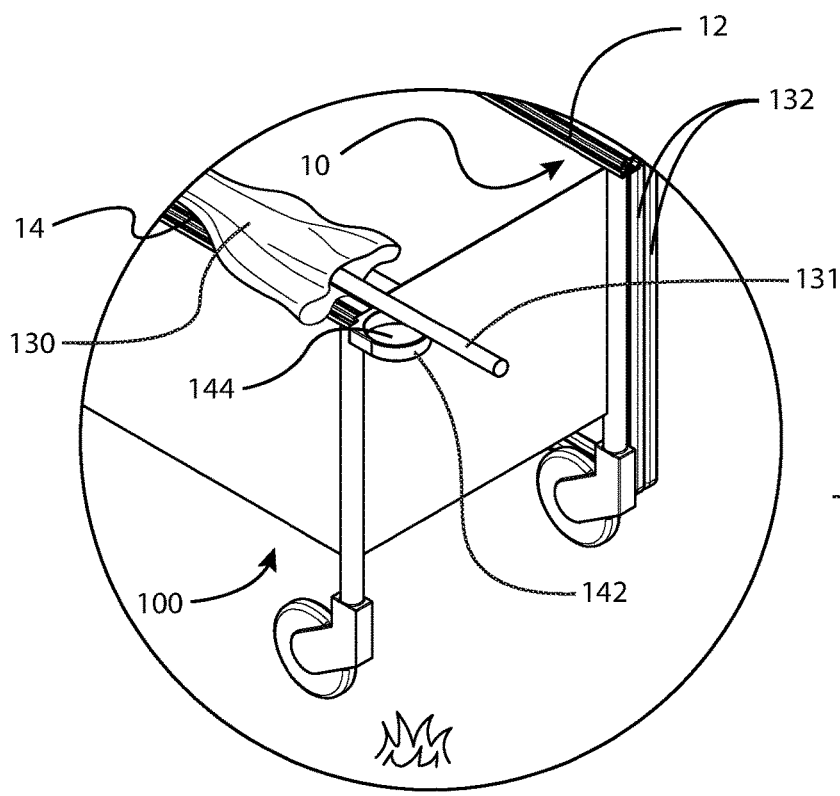

An alternative embodiment of the umbrella support of the wagon frame assembly 10 is illustrated in FIGS. 23a and 23b. As shown in these figures, similar to the umbrella holster 32 described above, the umbrella holder ring 142 of the alternative embodiment comprises an annular structure defining a central aperture 144, and a pair outwardly extending protrusions that are slidingly received within the oppositely disposed side T-slots of the longitudinal frame member 14. However, unlike the umbrella holster 32 described above, the umbrella holder ring 142 depicted in FIGS. 23a and 23b does not include a lower holster portion. The umbrella holder ring 142 is designed to be used when the umbrella shaft 131 of umbrella 130 is staked into the ground (refer to FIG. 23a). In this alternative embodiment, when the umbrella 130 is ready to be transported using the wagon 100, the umbrella shaft 131 is pulled out of the ground, and the umbrella 130 is laid on the top of the wagon 100 (see FIG. 23b).

It is readily apparent that the aforedescribed wagon frame assembly 10 offer numerous advantages. First, the wagon frame assembly 10 is able to support one or more objects (e.g., chairs 132 and umbrella 130) proximate to a periphery of a wagon bed 110 so as to leave a central region of the wagon bed 110 open for additional objects (e.g., coolers, blankets, clothing items, etc.). Secondly, the aforedescribed wagon frame assembly 10 obviates the need for loading and unloading the entire contents of a wagon 100 each time the wagon 100 is moved from one location to another location at a particular event. Finally, the wagon frame assembly 10 described herein is adjustable so as to enable the wagon frame assembly 10 to fit a plurality of wagon beds 110 having different sizes.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. An adjustable wagon frame assembly, comprising:
    a frame structure having a plurality of frame members, the frame structure configured to fit at least partially inside a wagon bed of a pull-type wagon, the frame structure configured to support one or more objects proximate to a periphery of the wagon bed so as to leave a central region of the wagon bed open for transporting one or more additional objects, one or more people, and/or one or more animals; and
    one or more hook members coupled to the frame structure, each of the one or more hook members configured to support a hanging object on a side of the wagon bed, and the one or more hook members being pivotably coupled to the frame structure so as to enable the one or more hook members to be rotated between an operative position and a stowed position;
    wherein at least one of the plurality of frame members is adjustable relative to at least another of the plurality of frame members so as to enable the frame structure to fit a plurality of wagon beds having different sizes.

2. The adjustable wagon frame assembly according to claim 1, wherein the frame structure comprises a plurality of longitudinal frame members and one or more transverse frame members attached between a pair of the longitudinal frame members, the one or more transverse frame members having an adjustable length so as to enable a width of the frame structure to be adjusted to accommodate the wagon beds having different sizes.

3. The adjustable wagon frame assembly according to claim 2, wherein the frame structure further comprises a plurality of leg members, the plurality of leg members configured to elevate at least one of the longitudinal frame members and/or at least one of the transverse frame members above a top surface of the wagon bed such that a portion of the frame structure protrudes above one or more sides of the wagon bed; and
    wherein at least one of the plurality of leg members is adjustably attached to at least one of the longitudinal frame members or at least one of the transverse frame members so as to accommodate the wagon beds having different sizes.

4. The adjustable wagon frame assembly according to claim 1, wherein the frame structure is at least partially collapsible so as to make the frame structure more compact for the storage and transportation thereof; and/or
    wherein the frame structure is capable of being disassembled so as to make the frame structure more compact for the storage and transportation thereof.

5. The adjustable wagon frame assembly according to claim 1, wherein the one or more hook members are adjustably connected to the frame structure so as to enable a position of the one or more hook members to be adjusted.

6. The adjustable wagon frame assembly according to claim 1, further comprising an umbrella support coupled to the frame structure, the umbrella support configured to support an umbrella in an upright position on the frame structure.

7. The adjustable wagon frame assembly according to claim 6, wherein the umbrella support comprises a lower holster portion and an upper annular portion, the umbrella configured to be positioned in the lower holster portion and the upper annular portion of the umbrella support, and the umbrella support configured to be removable from the frame structure.

8. The adjustable wagon frame assembly according to claim 1, wherein the frame structure further comprises one or more removable end caps detachably connected to one or more of the plurality of frame members, the one or more removable end caps enabling a variety of different accessories to be selectively attached to, and detached from, the one or more of the plurality of frame members.

9. A wagon frame assembly, comprising:
    a frame structure having a plurality of frame members, the frame structure configured to fit at least partially inside a wagon bed of a pull-type wagon, the frame structure configured to support one or more objects proximate to a periphery of the wagon bed so as to leave a central region of the wagon bed open for transporting one or more additional objects, one or more people, and/or one or more animals; and
    one or more hook members and/or an umbrella support coupled to the frame structure, each of the one or more hook members configured to support a hanging object on a side of the wagon bed, the umbrella support configured to support an umbrella in an upright position on the frame structure;
    wherein the frame structure comprises a plurality of longitudinal frame members and one or more transverse frame members attached between a pair of the longitudinal frame members, the one or more transverse frame members having an adjustable length so as to enable a width of the frame structure to be adjusted to accommodate wagon beds having different sizes;
    wherein the frame structure further comprises a plurality of leg members, the plurality of leg members configured to elevate at least one of the longitudinal frame members and/or at least one of the transverse frame members above a top surface of the wagon bed such that a portion of the frame structure protrudes above one or more sides of the wagon bed; and
    wherein at least one of the plurality of leg members is adjustably attached to at least one of the longitudinal frame members or at least one of the transverse frame members so as to accommodate the wagon beds having different sizes.

10. The wagon frame assembly according to claim 9, wherein the frame structure is at least partially collapsible so as to make the frame structure more compact for the storage and transportation thereof; and/or
    wherein the frame structure is capable of being disassembled so as to make the frame structure more compact for the storage and transportation thereof.

11. The wagon frame assembly according to claim 9, wherein the one or more hook members are adjustably connected to the frame structure so as to enable a position of the one or more hook members to be adjusted; and wherein the one or more hook members are pivotably coupled to the frame structure so as to enable the one or more hook members to be rotated between an operative position and a stowed position.

12. The wagon frame assembly according to claim 9, wherein the frame structure further comprises one or more removable end caps detachably connected to one or more of the plurality of frame members, the one or more removable end caps enabling a variety of different accessories to be selectively attached to, and detached from, the one or more of the plurality of frame members.

13. A wagon frame system, comprising:
a pull-type wagon having a wagon bed and a graspable handle, the wagon bed comprising a bed floor and a plurality of sides extending upwardly from the bed floor; and
a frame structure having a plurality of frame members, the frame structure configured to be inserted into the wagon bed of the pull-type wagon, the frame structure configured to support one or more objects proximate to a periphery of the wagon bed so as to leave a central region of the wagon bed open for transporting one or more additional objects, one or more people, and/or one or more animals;
wherein the frame structure comprises a plurality of leg members, the plurality of leg members configured to rest on the bed floor of the wagon bed so that a portion of the frame structure protrudes above the plurality of sides of the wagon bed.

14. The wagon frame system according to claim 13, further comprising one or more hook members coupled to the frame structure, each of the one or more hook members configured to support a hanging object on a respective one of the plurality of sides of the wagon bed, at least one of the one or more hook members extending outwardly from the frame structure above a top edge of one of the plurality of sides of the wagon bed.

15. The wagon frame system according to claim 13, further comprising an umbrella support coupled to the frame structure, the umbrella support configured to support an umbrella in an upright position on the frame structure.

* * * * *